(12) United States Patent
MolavianJazi et al.

(10) Patent No.: US 11,968,019 B2
(45) Date of Patent: Apr. 23, 2024

(54) EIGENVECTOR-BASED METHOD AND APPARATUS FOR MIMO EQUALIZER DESIGN VIA LINEAR INTEGER FORCING ARCHITECTURE

(71) Applicant: Lenovo (Singapore) Pte. Ltd., New Tech Park (SG)

(72) Inventors: Ebrahim MolavianJazi, Santa Clara, CA (US); Vijay Nangia, Woodridge, IL (US); Ahmed Hindy, Forest Park, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/797,980

(22) PCT Filed: Feb. 22, 2021

(86) PCT No.: PCT/IB2021/051481
§ 371 (c)(1),
(2) Date: Aug. 5, 2022

(87) PCT Pub. No.: WO2021/165935
PCT Pub. Date: Aug. 26, 2021

(65) Prior Publication Data
US 2023/0058307 A1    Feb. 23, 2023

Related U.S. Application Data

(60) Provisional application No. 62/979,407, filed on Feb. 20, 2020.

(51) Int. Cl.
*H04B 7/08* (2006.01)
*H04L 25/03* (2006.01)
*H04L 25/02* (2006.01)

(52) U.S. Cl.
CPC ......... *H04B 7/0848* (2013.01); *H04B 7/0871* (2013.01); *H04L 25/03038* (2013.01);
(Continued)

(58) Field of Classification Search
CPC . H04B 7/0848; H04B 7/0871; H04L 25/0248; H04L 2025/03547; H04L 2025/03726; H04L 25/3038
See application file for complete search history.

(56) References Cited

U.S. PATENT DOCUMENTS

| 2006/0018410 A1 | 1/2006 | Onggosanusi et al. |
| 2014/0016677 A1 | 1/2014 | Dua et al. |
| 2016/0309484 A1* | 10/2016 | Hui ...................... H04B 7/0413 |

OTHER PUBLICATIONS

PCT International Search Report for PCT/IB2021/051481, Lenovo (Singapore) Pte. Ltd., dated May 25, 2021.
(Continued)

*Primary Examiner* — Rahel Guarino
(74) *Attorney, Agent, or Firm* — Loppnow & Chapa

(57) ABSTRACT

A method and apparatus are provided in which a set of reference signals is received (2102), and a set of channel signatures for a multiple antenna communication channel is estimated (2104). Channel state information including a set of quality metrics is calculated (2106). In response to the set of quality metrics satisfying a criterion, the baseline receiver for the multiple antenna communication channel is selected (2108). In response to the set of quality metrics not satisfying the criterion, the alternative receiver for the multiple antenna communication channel is selected (2110). The selectable alternative receiver for the multiple antenna communication channel at the user equipment is based on a set of integer linear combinations, where each integer linear combination is based on at least a pair of channel signatures from the estimated set of channel signatures (2112).

22 Claims, 17 Drawing Sheets

(52) U.S. Cl.
CPC ........... *H04L 25/0248* (2013.01); *H04L 2025/03547* (2013.01); *H04L 2025/03726* (2013.01)

(56) References Cited

OTHER PUBLICATIONS

PCT International Search Report for PCT/IB2021/051483, Lenovo (Singapore) Pte. Ltd., dated May 26, 2021.
3GPP TS 36.101 V13.16.0 (Jun. 2019), 3rd Generation Partnership Project; Technical Specification Group Radio Access Network; Evolved Universal Terrestrial Radio Access (E-UTRA); User Equipment (UE) radio transmission and reception (Release 13).
3GPP TR 36.829 V11.1.0 (Dec. 2012), 3rd Generation Partnership Project; Technical Specification Group Radio Access Network; Enhanced performance requirement for LTE User Equipment (UE) (Release 11).
Jiening Zhan et al., "Integer-Forcing Linear Receivers", IEEE Transactions on Information Theory, vol. 60, No. 12, Dec. 2014, pp. 7661-7685, doi: 10.1109/TIT.2014.2361782.
Lili Wei et al., "Integer-Forcing Linear Receiver Design with Slowest Descent Method", IEEE Transactions on Wireless Communications, vol. 12, No. 6, Jun. 2013, pp. 2788-2796, doi: 10.1109/TCOMM.2013.050613.120835.
A. Sakzad et al., "On Complex LLL Algorithm for Integer Forcing Linear Receivers", 2013 Australian Communications Theory Workshop (AusCTW), pp. 13-17.
Baojian Zhou et al., "A Quadratic Programming Relaxation Approach to Compute-and-Forward Network Coding Design", 2014 IEEE International Symposium on Information Theory, pp. 2296-2300.
Ahmed Hindy et al., "Lattice Coding and Decoding for Multiple-Antenna Ergodic Fading Channels", IEEE Transactions on Communications, vol. 65, No. 5, May 2017, pp. 1873-1885, doi: 10.1109/TCOMM.2017.2665492.
Ahmed Hindy et al., "Ergodic Fading MIMO Dirty Paper and Broadcast Channels: Capacity Bounds and Lattice Strategies", IEEE Transactions on Wireless Communications, vol. 16, No. 8, Aug. 2017, pp. 5525-5536, doi: 10.1109/TWC.2017.2712631.
Ahmed Hindy et al., "On the Separability of Ergodic Fading MIMO Channels: A Lattice Coding Approach", IEEE Transactions on Communications, vol. 66, No. 12, Dec. 2018, pp. 5990-6002, doi: 10.1109/TCOMM.2018.2855191.
Amin Sakzad et al., "Integer-Forcing MIMO Linear Receivers Based on Lattice Reduction", IEEE Transactions on Wireless Communications, vol. 12, No. 10, Oct. 2013, pp. 4905-4915, doi: 10.1109/TWC.2013.090513.121465.
Robert F.H. Fischer et al., "Factorization Approaches in Lattice-Reduction-Aided and Integer-Forcing Equalization", International Zurich Seminar on Communications (IZS), Mar. 2-4, 2016, pp. 108-112, doi: 10.3929/ethz-a-010646822.
Lili Wei et al., "Integer-Forcing Linear Receiver Design over MIMO Channels", Globecom 2012—Signal Processing for Communications Symposium, pp. 3560-3565.
Asma Mejri et al., "Practical Implementation of Integer Forcing Linear Receivers in MIMO Channels", 2013 IEEE 78th Vehicular Technology Conference (VTC Fall), pp. 1-5.
J. Fincke et al., "Improved Methods for Calculating Vectors of Short Length in a Lattice, Including a Complexity Analysis", Mathematics of Computation, vol. 44, No. 170, Apr. 1985, pp. 463-471.
C.P. Schnorr et al., "Lattice Basis Reduction: Improved Practical Algorithms and Solving Subset Sum Problems", Jul. 1993, pp. 1-27.
Song-Nam Hong et al., "Compute-and-Forward Strategies for Cooperative Distributed Antenna Systems", IEEE Transactions on Information Theory, vol. 59, No. 9, Sep. 2013, pp. 5227-5243, doi: 10.1109/TIT.2013.2265695.
Saeid Sahraei et al., "Compute-and-Forward: Finding the Best Equation", Fifty-second Annual Allerton Conference, Allerton House, UIUC, Illinois, USA, Oct. 1-3, 2014, pp. 227-233.
Saeid Sahraei et al., "Polynomially Solvable Instances of the Shortest and Closest Vector Problems With Applications to Compute-and-Forward", IEEE Transactions on Information Theory, vol. 63, No. 12, Dec. 2017, pp. 7780-7792, doi: 10.1109/TIT.2017.2759281.
Jinming Wen et al., " A Linearithmic Time Algorithm for a Shortest Vector Problem in Compute-and-Forward Design", 2016 IEEE International Symposium on Information Theory, pp. 2344-2348.
William Liu et al., "Efficient Integer Coefficient Search for Compute-and-Forward", IEEE Transactions on Wireless Communications, vol. 15, No. 12, Dec. 2016, pp. 8039-8050, doi: 10.1109/TWC.2016.2611580.
Liqin Ding et al., "Exact SMP Algorithms for Integer-Forcing Linear MIMO Receivers", IEEE Transactions on Wireless Communications, vol. 14, No. 12, Dec. 2015, pp. 6955-6966, doi: 10.1109/TWC.2015.2462844.
Jinming Wen et al., "An Efficient Optimal Algorithm for Integer-Forcing Linear MIMO Receivers Design", 2017 IEEE International Conference on Communications (ICC), pp. 1-6.
Or Ordentlich et al., "Precoded Integer-Forcing Universally Achieves the MIMO Capacity to Within a Constant Gap", IEEE Transactions on Information Theory, vol. 61, No. 1, Jan. 2015, pp. 323-340, doi: 10.1109/TIT.2014.2370047.
Bobak Nazer et al., "Compute-and-Forward: Harnessing Interference Through Structured Codes", IEEE Transactions on Information Theory, vol. 57, No. 10, Oct. 2011, pp. 6463-6486, doi: 10.1109/TIT.2011.2165816.

\* cited by examiner

400

| Correlation Level | Tx Corr. Parameter α | Rx Corr. Parameter β |
|---|---|---|
| Low | 0 | 0 |
| Medium A | 0.3 | 0.3874 |
| Medium | 0.3 | 0.9 |
| High | 0.9 | 0.9 |

FIG. 4

| SINR/$N_t$ Correlation | <-10 (dB) | (-10)-(-5) (dB) | (-5)-0 (dB) | 0-5 (dB) | 5-10 (dB) | 10-15 (dB) | 15-20 (dB) | 20-25 (dB) | 25-30 (dB) |
|---|---|---|---|---|---|---|---|---|---|
| Low | 1 | 1 | 1 | 1 | 2 | 2 | 3 | 4 | 4 |
| Medium A | 1 | 1 | 1 | 1 | 2 | 2 | 4 | 4 | 5 |
| Medium | 1 | 1 | 1 | 1 | 2 | 3 | 4 | 5 | 6 |
| High | 1 | 1 | 1 | 1 | 2 | 4 | 5 | 8 | 9 |

FIG. 5

| SINR/$N_t$ Correlation | <-10 (dB) | (-10)-(-5) (dB) | (-5)-0 (dB) | 0-5 (dB) | 5-10 (dB) | 10-15 (dB) | 15-20 (dB) | 20-25 (dB) | 25-30 (dB) |
|---|---|---|---|---|---|---|---|---|---|
| Low | 1 | 1 | 1 | 1 | 1 | 1 | 1 | 1 | 1 |
| Medium A | 1 | 1 | 1 | 2 | 2 | 3 | 3 | 3 | 4 |
| Medium | 1 | 1 | 1 | 2 | 3 | 4 | 5 | 6 | 7 |
| High | 1 | 1 | 1 | 2 | 4 | 5 | 6 | 8 | 9 |

| SINR/$N_t$ Correlation | <-10 (dB) | (-10)-(-5) (dB) | (-5)-0 (dB) | 0-5 (dB) | 5-10 (dB) | 10-15 (dB) | 15-20 (dB) | 20-25 (dB) | 25-30 (dB) |
|---|---|---|---|---|---|---|---|---|---|
| Low | 1 | 1 | 1 | 2 | 3 | 4 | 5 | 8 | 11 |
| Medium A | 1 | 1 | 1 | 2 | 3 | 4 | 6 | 9 | 12 |
| Medium | 1 | 1 | 2 | 2 | 3 | 5 | 7 | 11 | 15 |
| High | 1 | 1 | 2 | 2 | 3 | 5 | 8 | 14 | 22 |

| SINR/$N_t$ Correlation | <-10 (dB) | (-10)-(-5) (dB) | (-5)-0 (dB) | 0-5 (dB) | 5-10 (dB) | 10-15 (dB) | 15-20 (dB) | 20-25 (dB) | 25-30 (dB) |
|---|---|---|---|---|---|---|---|---|---|
| Low | 1 | 1 | 1 | 2 | 2 | 3 | 3 | 4 | 4 |
| Medium A | 1 | 1 | 2 | 2 | 4 | 5 | 8 | 11 | 13 |
| Medium | 1 | 1 | 2 | 3 | 4 | 6 | 10 | 14 | 20 |
| High | 1 | 1 | 2 | 2 | 4 | 7 | 12 | 20 | 30 |

| SINR/N_t  Correlation | <-10 (dB) | (-10)-(-5) (dB) | (-5)-0 (dB) | 0-5 (dB) | 5-10 (dB) | 10-15 (dB) | 15-20 (dB) | 20-25 (dB) | 25-30 (dB) |
|---|---|---|---|---|---|---|---|---|---|
| Low | 1 | 1 | 1 | 1 | 1 | 1 | 1 | 1 | 1 |
| Medium A | 1 | 1 | 1 | 2 | 2 | 3 | 4 | 4 | 4 |
| Medium | 1 | 1 | 2 | 2 | 4 | 5 | 6 | 7 | 8 |
| High | 1 | 1 | 1 | 2 | 4 | 6 | 8 | 9 | 11 |

| SINR/N_t  Correlation | <-10 (dB) | (-10)-(-5) (dB) | (-5)-0 (dB) | 0-5 (dB) | 5-10 (dB) | 10-15 (dB) | 15-20 (dB) | 20-25 (dB) | 25-30 (dB) |
|---|---|---|---|---|---|---|---|---|---|
| Low | 1 | 1 | 1 | 2 | 3 | 4 | 7 | 11 | 17 |
| Medium A | 1 | 1 | 1 | 3 | 3 | 5 | 8 | 14 | 22 |
| Medium | 1 | 1 | 1 | 3 | 3 | 5 | 10 | 17 | 26 |
| High | 1 | 1 | 1 | 3 | 3 | 5 | 8 | 14 | 28 |

FIG. 10

| SINR/$N_t$ Correlation | <-10 (dB) | (-10)-(-5) (dB) | (-5)-0 (dB) | 0-5 (dB) | 5-10 (dB) | 10-15 (dB) | 15-20 (dB) | 20-25 (dB) | 25-30 (dB) |
|---|---|---|---|---|---|---|---|---|---|
| Low | 1 | 1 | 1 | 2 | 2 | 2 | 2 | 2 | 2 |
| Medium A | 1 | 2 | 2 | 3 | 5 | 7 | 9 | 12 | 16 |
| Medium | 1 | 2 | 2 | 4 | 5 | 8 | 13 | 18 | 25 |
| High | 1 | 2 | 2 | 3 | 6 | 10 | 17 | 28 | 40 |

FIG. 11

| SINR/$N_t$ Correlation | <-10 (dB) | (-10)-(-5) (dB) | (-5)-0 (dB) | 0-5 (dB) | 5-10 (dB) | 10-15 (dB) | 15-20 (dB) | 20-25 (dB) | 25-30 (dB) |
|---|---|---|---|---|---|---|---|---|---|
| Low | 1 | 1 | 1 | 2 | 3 | 4 | 5 | 7 | 10 |
| Medium A | 1 | 1 | 1 | 3 | 4 | 6 | 11 | 19 | 28 |
| Medium | 1 | 1 | 2 | 3 | 5 | 8 | 14 | 23 | 35 |
| High | 1 | 1 | 3 | 3 | 3 | 7 | 13 | 23 | 43 |

FIG. 12

EIGENVECTOR-BASED METHOD AND APPARATUS FOR MIMO EQUALIZER DESIGN VIA LINEAR INTEGER FORCING ARCHITECTURE

FIELD OF THE INVENTION

The present disclosure is directed to a method and apparatus for MIMO equalizer design including an eigenvector-based approach involving a linear integer forcing architecture.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Evolved Universal Terrestrial Radio Access (E-UTRA), Long Term Evolution (LTE), Universal Mobile Telecommunications Service (UMTS), Global System for Mobile Communication (GSM), and/or Enhanced Data GSM Environment (EDGE).

With each standard comes various approaches for structuring and organizing one or more potential communication channels between the network and one or more communication devices. In at least some instances, it may be possible to organize the channels where multiple antennas at the transmitter, the receiver, or both can assist in creating diversities, which allow an increased number of channels to be defined within the same channel space.

Correspondingly, the transmitter or receiver architecture could be selected to better support any one of the particular approaches for structuring and organizing the one or more potential communication channels. In some instances, multiple potential transmitter or receiver architectures could be available.

The present inventors have recognized it may be beneficial to develop an approach that can assist in selecting between multiple different transmitter and receiver types/architectures depending upon one or more detectable conditions, taking into account the particular related approach for structuring and organizing the communication channel, as well as the current detected channel conditions. The present inventors have further recognized that it may be possible to better select integer linear combinations in instances in which an integer forcing type receiver has been selected to be used.

SUMMARY

The present application provides a method in a user equipment. The method includes receiving a set of reference signals, and estimating a set of channel signatures for a multiple antenna communication channel, based on the received set of reference signals. Channel state information including a set of quality metrics is calculated. In response to the set of quality metrics satisfying a criterion, the baseline receiver for the multiple antenna communication channel is selected at the user equipment. In response to the set of quality metrics not satisfying the criterion, the alternative receiver for the multiple antenna communication channel is selected at the user equipment. The selectable alternative receiver for the multiple antenna communication channel at the user equipment is based on a set of integer linear combinations, where each integer linear combination is based on at least a pair of channel signatures from the estimated set of channel signatures.

According to another possible embodiment, a user equipment is provided. The user equipment includes a transceiver, which has a selectable baseline receiver, and a selectable alternative receiver, that receives a set of reference signals. The user equipment further includes a controller that estimates a set of channel signatures for a multiple antenna communication channel, based on the received set of reference signals, and calculates channel state information including a set of quality metrics. The controller selects the baseline receiver for the multiple antenna communication channel at the user equipment, in response to the set of quality metrics satisfying a criterion, and the controller selects the alternative receiver for the multiple antenna communication channel at the user equipment, in response to the set of quality metrics not satisfying a criterion. The selectable alternative receiver for the multiple antenna communication channel at the user equipment is based on a set of integer linear combinations, where each integer linear combination is based on at least a pair of channel signatures from the estimated set of channel signatures.

These and other features, and advantages of the present application are evident from the following description of one or more preferred embodiments, with reference to the accompanying drawings.

BRIEF DESCRIPTION OF THE DRAWINGS

FIG. 4 is a table providing a MIMO correlation matrix at high, medium and low levels including a corresponding value for each of a transmit correlation parameter $\alpha$ and a receive correlation parameter $\beta$ for ULA MIMO correlation matrices;

FIG. 5 is a numerical table for an integer-forcing search radius for 2×2 real MIMO;

FIG. 6 is a numerical table for an integer-forcing search radius for 2×4 real MIMO;

FIG. 7 is a numerical table for an integer-forcing search radius for 4×2 real MIMO;

FIG. 8 is a numerical table for an integer-forcing search radius for 4×4 real MIMO;

FIG. 9 is a numerical table for an integer-forcing search radius for 2×8 real MIMO;

FIG. 10 is a numerical table for an integer-forcing search radius for 8×2 real MIMO;

FIG. 11 is a numerical table for an integer-forcing search radius for 4×8 real MIMO;

FIG. 12 is a numerical table for an integer-forcing search radius for 8×4 real MIMO;

DETAILED DESCRIPTION OF THE PREFERRED EMBODIMENT(S)

Figure 1:
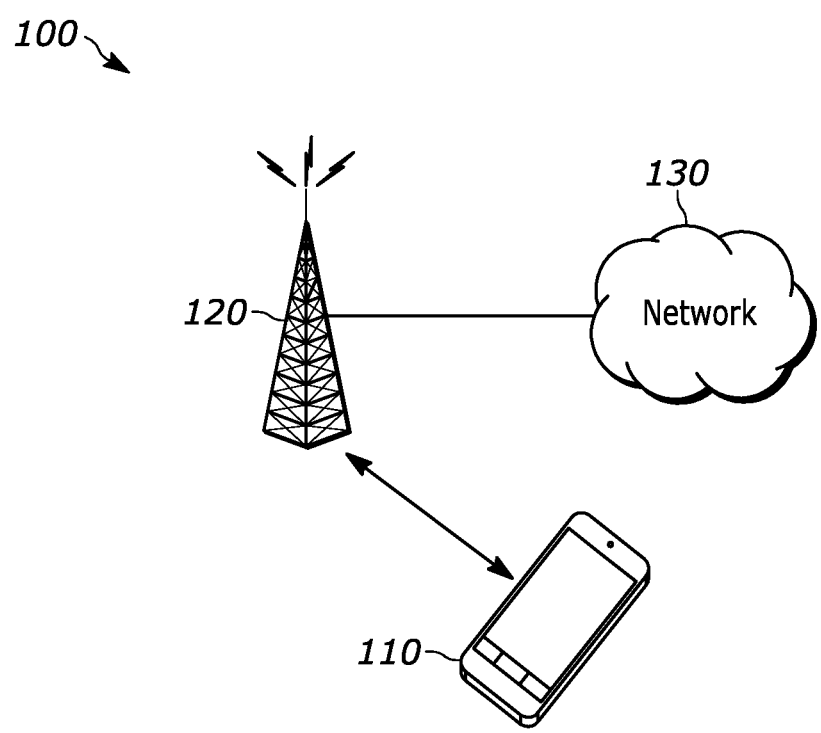
FIG. 1 is a block diagram of an exemplary network environment in which the present invention is adapted to operate.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide for various methods and apparatus including an eigenvector-based method and apparatus for MIMO equalizer design via linear integer forcing architecture.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

A wireless fading multiple antenna multiple-input multiple-output (MIMO) channel combines/mixes the transmitted input information streams across time, frequency, and spatial dimensions. Equalization is a meaningful part of receiver design in general, and in MIMO operation in particular, where in at least some instances there may be a preference to cancel out the combining/mixing impacts of wireless fading MIMO channel on the input signal, assuming some level of channel state information (CSI) being available at the receiver, so that original information streams can be separated out. At least one class of receivers are linear receivers, such as the minimum mean square error (MMSE) receiver, where only linear operations, that can be modeled as matrix operations, are used in order to reduce the implementation complexity.

Selection and design of low-complexity receivers for user-equipment (UE) is an aspect of the MIMO technology that can impact the physical-layer (PHY) performance of the Radio Access Network (RAN) for wireless communications. Linear receivers apply some linear post-processing, which can sometimes be referred to as equalization, to the received signal to partially or completely separate out the multiple input information streams and facilitate single-stream decoding. This can simplify the implementation, since generally no joint decoding across receive antennas is needed as in nonlinear receivers such as the maximum likelihood (ML) receiver. An example of linear receivers is the minimum mean square error (MMSE) receiver, which is the baseline receiver assumed for the 3GPP 4G-LTE standard.

A concern of the current linear receivers, such as the MMSE receiver, is that they may perform poorly for close-to-singular MIMO channels in open-loop situations, where channel state information (CSI) is not available at the Base Station (eNodeB). At least one reason for this is that separating out the multiple information streams for such channels can lead to noise enhancement. In such scenarios, the channel is practically considered to be rank-deficient, for which transmitting multiple information streams (i.e. spatial multiplexing) is avoided, and various copies of a smaller number of information streams are transmitted over the eNodeB antennas (i.e., transmit diversity).

Figure 2:
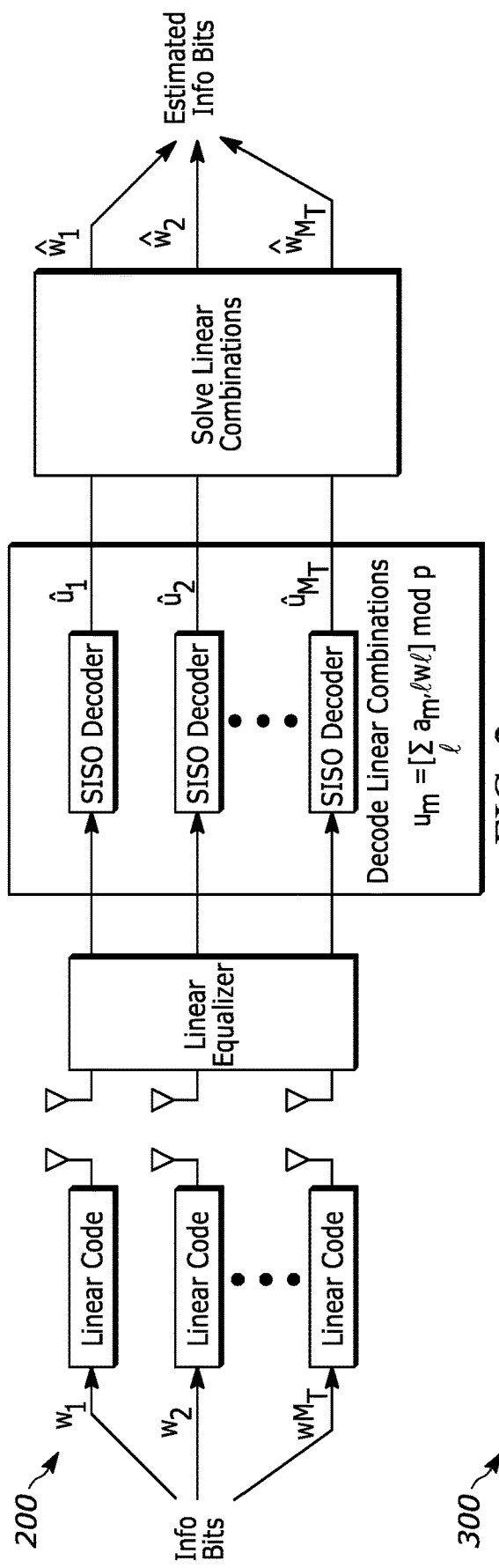
FIG. 2 is a block diagram of an exemplary integer-forcing (IF) receiver.
Figure 3:
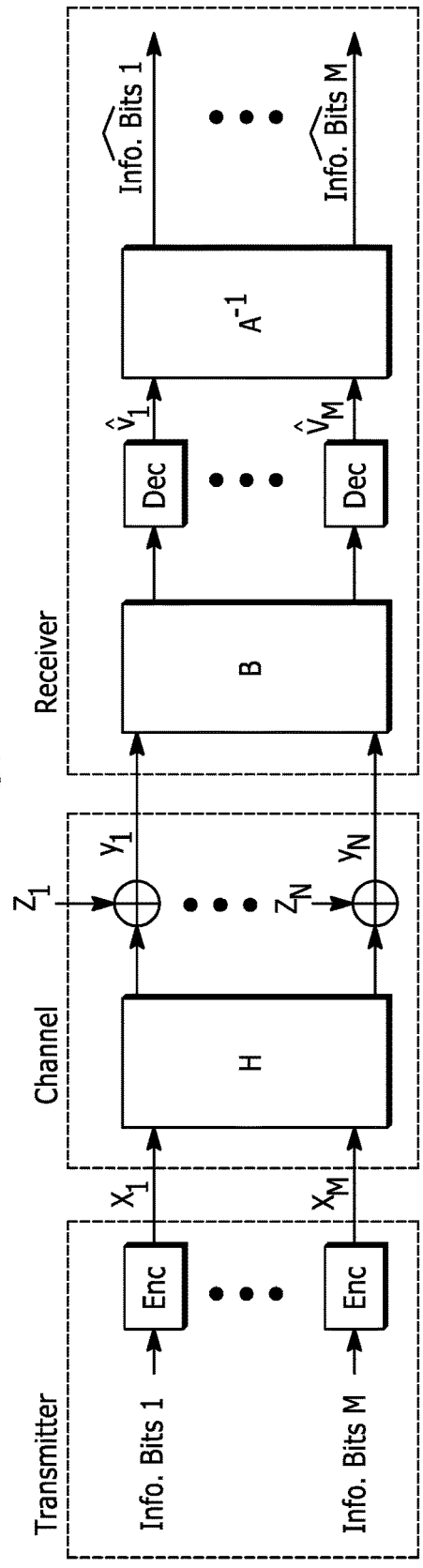
FIG. 3 is a block diagram of a more detailed exemplary integer-forcing (IF) operation.

Recently, the integer-forcing (IF) receiver, as shown in FIGS. 2 and 3, has been previously introduced as a general and effective linear receiver, when used with linear codes at the transmitter. For some MIMO channels, the IF receiver reduces to the MMSE receiver and so can provide the same general performance. For many MIMO channels (e.g., open-loop MIMO channels with no CSI information at the transmitter, so no CSI-based precoder selection at the transmitter), however, the IF receiver offers moderate to meaningful rate/reliability gain over the MMSE receiver by harnessing the interference generated by multiple information streams of different eNodeB antennas and minimizing the effective noise observed by the decoders.

At least one reason for this performance improvement is that, the IF receiver harnesses the inter-stream interference by decoding certain integer-linear combinations of the information streams that minimize the noise observed by the decoders. Since the same linear code (i.e., the same modulation and coding scheme (MCS) and therefore the same rate) is generally used at all transmit antennas, the integer-linear combinations of the codewords are also valid codewords and can be decoded. The original information bits are then recovered using an integer-linear solver. Note that, the MMSE receiver is a special case of the IF receiver where the integer-linear combinations form the identity matrix.

Correspondingly, the IF receiver includes the MMSE receiver as a special case. FIG. 2 illustrates a block diagram 200 of an exemplary integer-forcing (IF) receiver. FIG. 3 illustrates a block diagram 300 of a more detailed exemplary integer-forcing (IF) operation.

At least one aspect of the IF receiver design is for the UE to run some search algorithm and find the more optimal integer-linear combinations that achieve a more promising performance. This is in general a difficult (NP-hard) problem, and the search algorithms might sometimes involve a more time-consuming and/or a more complex search algorithm. As will be discussed in the next section, for a considerable portion of channels, however, such a search algorithm might exhaust the UE computational resources to in some instances finally conclude that the optimal integer combinations are (close-to-) the identity matrix and that the MMSE receiver is indeed optimal or almost optimal. In general, several algorithms with various complexity levels have been proposed.

It can therefore be somewhat beneficial to be able to identify conditions and characteristics for the MIMO channel under which the MMSE receiver is (almost) optimal, versus identifying those conditions and characteristics under which the rate/reliability gains of the IF receiver (with integer combinations that can be far from the identity matrix) are significant enough to justify the spending of UE computational resources for finding more optimal integer combinations. On the other hand, for the cases where IF indeed provides a reasonable gain, it is beneficial that such a gain be achieved within a reasonable search complexity.

In accordance with embodiments of the present application, this present disclosure includes various combination of at least three aspects:

First, the disclosure identifies two conditions for linear receiver selection based on the MIMO channel characteristics, the operating signal-to-noise ratio (SNR) and interference level measured at the receiver, that determine if the common MMSE receiver is (almost) optimal or whether the IF receiver should be used. These conditions can typically be conveniently checked to recommend the appropriate linear receiver to be selected, and can considerably save the UE computational (and power, etc.) resources.

Second, the disclosure proposes a new algorithm with a reasonable computational complexity that finds the (close-to-) optimal integer-linear combinations required for the IF receiver design. For example, detailed description of an eigen-vector-based design for IF equalizer, where certain pairs of eigen-vectors of wireless MIMO channel are used to define the integer-linear combinations required for the IF receiver design.

Implementation aspects for the integer-forcing receiver for both real and complex channel models, including how to incorporate coded modulation techniques.

The contributions in this disclosure are described in the context of open-loop MIMO receiver design, but can be applied to other wireless setting as well, e.g., closed-loop MIMO receiver-design, precoder design for MIMO transmitter, etc.

MIMO Receiver Selection

Denote a MIMO channel with $N_t$ transmit and $N_r$ receive antennas by the matrix H=, $[h_1, \ldots, h_{N_t}]$, whose i-th column is denoted by $h_i$ which is of length $N_r$.

One commonly used metric for describing the singularity level of the MIMO channel is the condition number of the channel matrix, defined as $$\kappa(H) = \frac{\sigma_{max}(H)}{\sigma_{min}(H)}$$

where $\sigma_{max}(H)$ and $\sigma_{min}(H)$ denote the largest and the smallest (non-zero) singular values of the channel matrix H, respectively. It is commonly assumed that MMSE achieves a good performance for well-conditioned MIMO channels, namely those with small condition numbers and thus far from singular, and a poor performance for ill-conditioned channels, namely those with high condition numbers and thus close to singular. Although such a conclusion provides a correct initial impression about the MIMO channel, it may be missing at least the following two aspects:

Condition number $\kappa(H)$ is mainly useful for (very) high SNR regimes, but does not necessarily provide an accurate description of the MIMO channel in moderate SNR regimes, which may also be of interest. For example, MMSE might still perform well for certain ill-conditioned channels in moderate SNR regimes, so there would be no need for using the IF receiver.

There exist certain rather well-conditioned channels, particularly in non-square settings with $N_t \neq N_r$ for which the IF receiver can meaningfully outperform the MMSE receiver, even at high SNR.

It has been also noticed by some researchers that, if a MIMO channel is orthogonal or close to orthogonal, then, irrespective of how small or large the condition number is, the MMSE performance may be optimal or almost optimal. Therefore, one would expect that, in addition to the condition number, the level of orthogonality of the MIMO channel matrix can also impact the MMSE performance.

To measure the orthogonality of the channel, one would intuitively consider the matrix $H^T H$, and compare the diagonal entries $\|h_i\|^2$ with the off-diagonal entries $(h_i, h_j)$, $i \neq j$. In line with this intuition, the following measure, referred to as the orthogonality defect (OD), sometimes also known as orthogonality deficiency or Hadamard ratio, is used in the theory of lattices and lattice reduction to quantify how much a matrix is orthogonal:

$$\delta(H) = \left( \frac{\prod_{i=1}^{N_t} \|h_i\|}{\sqrt{|\det(H^T H)|}} \right)^{1/N_t}.$$

In the literature, other variants of the above formula have also appeared, such as $1-\delta(H)$, $1/\delta(H)$, $(\delta(H))^{N_t}$, $1-(\delta(H))^{N_t}$, or $(1/\delta(H))^{N_t}$, or orthogonality defect for the Hermitian of the inverse of the channel matrix $(\delta(H^{-H}))^{2N_t}$. For any channel with rank(H)=$N_t$, one can use the Hadamard inequality to show that $\delta(H) \geq 1$, with $\delta(H)=1$ if and only if the channel matrix is orthogonal. As the channel moves away from orthogonality, the $\delta(H)$ value increases. Although OD is a useful figure of merit in some situations, it is also missing certain aspects:

Similar to the condition number, the OD measure is independent of the operating SNR and is therefore less useful for moderate SNR regimes.

Of interest, OD may be more useful when rank(H)=$N_t$. When $N_t > N_r$ (which is often the case in downlink communications), or even when $N_t \leq N_r$ but the channel is rank-deficient so that rank(H)<$N_t$, the OD measure as defined above becomes less useful since det($H^T H$)=0.

Integer-Forcing Receiver

Denote a MIMO channel with $N_t$ transmit and $N_r$ receive antennas by the matrix H=$[h_1, \ldots, h_{N_t}]$, whose i-th column is denoted by $h_i$ which is of size $N_r$. Communication is coherent (i.e., with ideal channel state information at the receiver) but open-loop (i.e., with no channel state information at the transmitter). This concern has been addressed under non-independent MIMO streams for uplink transmission, downlink transmission, as well as single-user MIMO, where close-to-capacity approaches were proposed under mild fading conditions using construction A lattices. This disclosure is more focused on Integer-Forcing receivers, where the problem is to construct the matrix $A=[\alpha_1 \ldots \alpha_{N_t}]$ that consists of $N_t$ integer-linear combinations/vectors, each of size $N_t$, needed for the IF receiver.

Some earlier discussion on the IF architecture has suggested that, using the optimal coding and modulation at the Base Station (eNodeB) and the optimal post-processing or equalization at the User Equipment (UE), the following transmission rate is achievable by the IF architecture:

$$R_{IF} = N_t \cdot \max_{\substack{A=[a_1 \ldots a_{N_t}] \\ integer, full\ rank}} \min_{m=1,\ldots,N_t} \frac{1}{2} \log^+\left(\frac{1}{a_m^T G_0 a_m}\right),$$

where $$G_0 = \left(I_{N_t} + \frac{SNR}{N_t} H^T H\right)^{-1}.$$

Equal-power allocation $$\frac{SNR}{N_t}$$

is used since communication is open-loop. Note that, the choice of A=I recovers the MMSE receiver, but need not be optimal. Some references also show (a slightly looser version of) the following bound on the length (i.e., Euclidean norm) of any potential integer combination, $$\|a\| \leq \varphi \triangleq \sqrt{1 + \frac{SNR}{N_t}(\sigma_{max}(H))^2},$$

where $\sigma_{max}(H)$ is the largest singular value of the channel matrix H.

Based on the formulation above, the optimal integer matrix A is the solution to $$A_{opt} = \operatorname*{argmin}_{\substack{A=[a_1 \ldots a_{N_t}] \\ integer, full\ rank \\ \|a_m\| \leq \varphi}} \max_{m=1,\ldots,N_t} a_m^T G_0 a_m.$$

This optimization problem can be expressed in a more enlightening form when we consider any full-rank matrix B, called a lattice basis, that satisfies $G_0=B^T B$, e.g., using the singular value decomposition (SVD) or the Cholskey decomposition. We can then write the problem as $$A_{opt} = \operatorname*{argmin}_{\substack{A=[a_1 \ldots a_{N_t}] \\ integer, full\ rank \\ \|a_m\| \leq \varphi}} \max_{m=1,\ldots,N_t} \|Ba_m\|,$$

which is known as the shortest independent vector problem (SIVP) in the theory of lattices, namely finding a collection of $N_t$ linearly independent (LI) integer vectors $\{\alpha_1, \ldots, \alpha_{N_t}\}$ such that among the lattice points $\{B\alpha_1, \ldots, B\alpha_{N_t}\}$ the vector with length $\max_m \|B\alpha_m\|$ is the shortest possible. This problem for a general matrix G (alternatively B) is known to be an NP-hard quadratic integer programming problem, but for the specific form and structure we have at hand, one can devise simplified exact or good approximate solutions.

The solution to this optimization matrix is not necessarily unique. As long as the vectors satisfy the LI condition and the length of the longest vector is minimized, there is potentially some flexibility in choosing the length and values of the other vectors, while still maintaining optimality.

The search is typically only performed once in every coherence interval, so if the coherence interval spans multiple codeword transmissions, then the complexity may become more reasonable.

In the literature, there are three approaches to this problem. The first approach simply performs some matrix operation on the lattice matrix $G_0$ or the channel matrix H and outputs a (possibly suboptimal) solution for the A matrix. The second approach considers the entire set or a selected subset of vectors that satisfy $\|\alpha\| \leq \varphi$ and then extracts the (optimal or suboptimal) solution by checking the LI condition. The third approach enforces the LI condition while searching within the set or a selected subset of vectors that satisfy $\|\alpha\| \leq \varphi$.

First Approach: Several algorithms simply apply an elementary or complex operation to the lattice matrix $G_0$ or the channel matrix H or variants thereof. Therefore, no search and selection is really involved. In the following, we briefly explain these methods.

1. Rounding the Channel Matrix: One can take the channel matrix H and construct a suboptimal integer matrix by simply taking element-wise rounding, A=[H].
2. Rounding the Eigenvectors: One can take the channel eigenvectors V from the SVD $H=U\Sigma V^T$ and construct a suboptimal integer matrix by taking element-wise rounding, A=[V].
3. Lattice Reduction (particularly Lenstra-Lenstra-Lovasz (LLL) lattice reduction algorithm): Since the lattice basis is not unique, one may perform a lattice reduction (LR) technique to find a shorter and more orthogonal basis for the lattice. More precisely, the basis matrices B and $\tilde{B}$ both generate the same lattice if $\tilde{B}=BT$ for some unimodular matrix T, i.e., a square integer invertible matrix whose inverse is also integer (or equivalently has det(T)=±1). In an LR technique, one considers the lattice basis satisfying $G_0=B^T B$, where matrix G is defined above, then applies the lattice reduction to get $\tilde{B}=BT$, and selects $A=T=B^{-1}\tilde{B}$ as the integer solution. At least one benefit of LR is that its computational complexity is independent of SNR. Some well-known LR algorithms include the Minkowski and HKZ methods whose complexities are exponential in the number of transmit antennas, but the most famous LR method is the LLL method whose complexity is polynomial in the number of transmit antennas. These algorithms are more optimal for small antenna arrays (e.g., 2 or 4 real transmit antennas), but become more suboptimal for large antenna arrays.

Second Approach: Some of the algorithms proposed in the literature for solving the optimization problem and finding the A matrix consist of three stages:
(i) Form a list of candidate short vectors based on some criterion;
(ii) Sort the candidate list in the ascending order of vector lengths (i.e., from shortest to longest);

(iii) Starting from the top of the list, search for $N_t$ shortest vectors in the list with the LI condition.

The third stage is usually accomplished by one of the following methods:

Gaussian Elimination: Put the sorted candidate list as columns of a matrix, then perform a Gaussian elimination on that matrix, and finally select the candidate vectors that first define a new dimension in the row-reduced-echelon form, namely those that correspond to pivots.

Block LI search: Starting from the top of the list, choose $N_t$ vectors at a time and check the LI condition with a rank test; continue until a full-rank matrix is found.

Greedy LI search: Starting from the top of the list, choose vectors with shortest lengths, one by one, such that they form an LI collection; continue until a full-rank matrix is found. This is more efficient due to the greedy sequential search.

For the first stage, several methods and algorithms have been proposed in the literature to form the list of candidate vectors. In the following, we briefly explain these methods.

4. Exhaustive Search: The original IF paper proposes an exhaustive search over all size-N t integer vectors whose Euclidean norm satisfy Hall $\|\alpha\|<\varphi$, by simply listing them all. This is a more optimal method, but the size of the search domain is roughly SNR $N_t$ possibilities.

5. Exhaustive Tree Search: find exact solutions to SIVP by performing exhaustive search using a depth-first tree-search algorithm (also known as sphere decoding) inspired by the Fincke-Pohst (FP) or Schnorr-Euchner (SE) enumeration. This is basically a faster implementation of the optimal exhaustive search that forms the elements of the valid integer vectors with $\|\alpha\|<\varphi$ sequentially, instead of generating the entire integer vector at once.

6. Exhaustive (Tree) Search via Lattice Reduction: Yet another exhaustive, but lower-complexity method uses the LR techniques as follows: Perform a lattice reduction first (e.g., the LLL reduction), and then use the reduced lattice basis $\tilde{B}$ for an exhaustive search (perhaps with the efficient tree-search version) to get the solution $\tilde{A}$. It is also proposed to use $\|\alpha\| \le \max_m \|\tilde{b}_m\|$ as the search radius, where $\tilde{b}_m$ denotes the m-th column of $\tilde{B}$. The final A matrix is formed by taking $A=T\tilde{A}=B^{-1}\tilde{B}\tilde{A}$. The reason is that the for any $\alpha$ vector, we can write $B\alpha=BTT^{-1}\alpha=\tilde{B}(T^{-1}\alpha) \triangleq \tilde{B}\tilde{\alpha}$, so that $\tilde{\alpha}=T^{-1}\alpha$ or $\alpha=T\tilde{\alpha}$.

7. Reduced Exhaustive with half-integer-inducing scaling: references have recently proposed a reduced, but optimal, exhaustive search which describes the optimal integer vector to be either a standard unit vector or a rounded version of an appropriate scaling of (some variant of) the $G_0$ matrix. In particular, $\alpha=[Wx]$ where x is some real-valued vector of size rank(H), and W is an $N_t \times$rank(H) matrix that satisfies $G_0=I_{N_t}-WW^T$. This method performs an exhaustive search for finding the appropriate scaling vector x, but a possible benefit is that the dimension of the search space will reduce if the number of transmit antennas strictly exceeds the rank of the channel, $N_t >$rank(H), in which case the search algorithm only considers real-valued scaling vectors in a space of dimension rank(H), instead of a space of dimension $N_t$. Since rounding is performed, one can reduce the search space from all real-valued scaling vectors to only those that lead to half-integer arguments for the rounding operation, where rounding would jump to a new value. Other references have considered variations of this approach.

8. Combination of Approach-1 Methods: One can consider a subset or all of the direct methods introduced in Approach-1 above, and generate multiple A matrices. Collecting all of the column vectors in these matrices into a candidate list, one can sort the list and run the LI test, to generate a new A matrix, which is still suboptimal, but potentially better than all of the original ones. The extra complexity for sorting and LI processing of the candidate list will not be high if only a few A matrices are combined.

9. Search along the Strongest Eigenvector: A heuristic intuition conceptually suggests choosing integer vectors close to the strongest channel direction, namely the eigenvector corresponding to $\sigma_{max}(H)$. This suboptimal strategy may be useful when $\sigma_{max}(H)$ is much larger than other singular values. However, no specific algorithm is mentioned in the literature.

10. Perturbation of Eigenvectors: It is argued that the integer vectors with small $\alpha^T G_0 \alpha$ values are of the form $\alpha=[v_1+\rho_i v_i]$, where $v_1$ is the strongest channel direction, namely the eigenvector corresponding to $\sigma_{max}(H)$, v with $2 \le i \le N_t$ are the other channel eigenvectors, and $\rho_i$ are real-valued perturbation factors. Due to the rounding operation, only those perturbation factors $\rho_i$ are considered that lead to half-integer arguments for the rounding operation, where rounding would jump to a new value. This suboptimal method has reasonably low complexity. To reduce the complexity even further, the search is limited to only a few directions, instead of all possible $N_t-1$ directions, and the search interval for perturbation factors $\rho_i$ are also limited. However, these are left as inputs to the algorithm, and no general recommendations are given for these modifications.

In some of the methods summarized above, the set of standard unit vectors, namely the columns of the default matrix $A=I_{N_t}$, are not necessarily included in the list of candidate vectors. In our numerical evaluations we have observed that, it is best to manually add these vectors to get a good performance, sometimes significantly better than that of the original methods.

Third Approach: A few algorithms have been proposed for the optimization problem and finding the A matrix, in which the LI condition is enforced while searching for new integer vectors or matrices. These algorithms are usually complex, but provably find the optimal solution. In the following, we briefly explain these methods.

11. Subspace Avoidance with Tree Search: Some references propose a method which is based on the Subspace Avoidance Problem (SAP), namely finding the shortest nonzero lattice point $B\alpha$ outside of a given vector space. Accordingly, a chain of SAP solutions are used to find an optimal A matrix as follows: the UE iteratively appends short linearly independent vectors to the A matrix, considers the subspace those vectors span, and avoids it to find the next shortest vector which will be trivially linearly independent, and repeats this until $N_t$ vectors are found. To make the search more efficient, tree-search methods such as (the modified versions of) the FP or SE enumeration strategies are used. Complexity upper bound is shown to be exponential in the number of transmit antennas $N_t$, but independent of SNR.

12. Full-Rank Matrix Update with Tree Search: Other references propose another iterative method for finding an optimal A matrix, which starts from a suboptimal solution (namely, a certain permutation of the $A=I_{N_t}$ matrix) and in each iteration the A matrix is updated by replacing a carefully selected column of A with a new vector α that induces a shorter lattice point Bα. The correct selection of the replacing column involves a new technique that ensures the LI condition. The search process stops when no new vector can be found to update the A matrix. To increase the search efficiency, the algorithm (i) runs over the LLL-reduced lattice and at the end converts the result back to the original lattice, and (ii) also uses the tree-search SE enumeration to search for new vectors. Complexity of this algorithm is again independent of SNR and exponential in the number of transmit antennas $N_t$, but slightly better than that of the SAP method mentioned above.

Each of the 12 methods explained above have their own merits and disadvantages. In summary, the main drawbacks of the existing methods are as follows:

The suboptimal methods usually sacrifice rate performance to achieve a low computational complexity. They usually perform well for smaller antenna arrays, but have degraded performance for large antenna arrays.

The optimal methods usually have high complexity, particularly for large antenna arrays.

Most of the methods do not provide any insight into the role of different channel parameters (such as the channel gains and the channel eigenvectors) and the operating SNR.

Simple Conditions for Linear Receiver Selection in MIMO Communications

The performance of the MMSE receiver is well-known to be dictated by the diagonal entries of the following matrix:

$$G_0 = \left(I_{N_t} + \frac{SNR}{N_t} H^T H\right)^{-1},$$

where $I_{N_t}$ denotes the identity matrix of size $N_t$, and equal-power allocation $$\frac{SNR}{N_t}$$

is used due to the open-loop communication consideration. The analysis also reveals that the entire matrix $G_0$ (and not only its diagonal entries) determines the achievable rate/reliability of the IF receiver.

Hereafter we use the slightly-modified matrix G, for which we reuse the term lattice matrix, to define our figures of merit for singularity and orthogonality, as follows:

$$G = \left(I_{N_t} + \frac{SINR}{N_t} H^T H\right)^{-1}.$$

Note that the signal-to-interference-plus-noise ratio (SINR) accounts for the aggregate interference power estimated at the receiver (e.g., signal channel and interference measured using reference signals such as CSI-RS in downlink transmission, and SRS (Sounding Reference Signals) in the uplink transmission). The SINR boils down to the SNR if no interference is measured at the receiver prior to transmission. Although the following new measures are defined in a similar manner to the standard/legacy ones, they are well-defined for any antenna array size; they correctly capture the role of SINR; and they recover their standard counterparts or variants thereof as the limiting point of asymptotically high SINR. To the best of our knowledge, these measures, as defined above, have not been introduced and employed before in the analysis of the MIMO wireless channels.

Modified Condition Numbers

A collection of measures of channel singularity, called the modified condition numbers, are proposed which are a generalization of the notion of conventional condition number κ(H) and capture all channel directions and also capture the role of SINR. They are the following collection of numbers $$\kappa_{mdf,i}(SINR, H) = \sqrt{\frac{1 + SINR(\sigma_1(H))^2/N_t}{1 + SINR(\sigma_i(H))^2/N_t}}, i = 1, \ldots, r,$$

where r=rank(H), and $[\sigma_1(H), \ldots, \sigma_r(H)]$ denotes the set of (non-zero) singular values of the channel matrix H in descending order. Note that, for a fixed channel and SINR, the collection of modified condition numbers $$\{\kappa_{mdf,1}(SINR,H), \ldots, \kappa_{mdf,r}(SINR,H)\}$$

form a sorted sequence in ascending order. Moreover, for a fixed channel and any fixed index i, $\kappa_{mdf,i}$(SINR, H) is an increasing function of the SINR whose value ranges in the interval $$1 \le \kappa_{mdf,i}(SINR, H) \le \frac{\sigma_1(H)}{\sigma_i(H)}.$$

In particular, for i=r, as SINR tends to infinity, we get $\kappa_{mdf,r}$(SINR, H)→κ(H), the commonly used condition number of the channel.

The set of modified condition numbers provide a quantitative metric for determining the relative strength of the channel directions for any given SINR. The channel directions with modified condition number close to 1 are stronger directions and those with large modified condition number are weaker channel directions.

Moreover, such concepts as channel singularity, ill-conditioned channels, and well-conditioned channels should be defined in terms of the largest modified condition number at a given SINR, namely $$\kappa_{mdf,r}(SINR, H) = \sqrt{\frac{1 + SINR(\sigma_{max}(H))^2/N_t}{1 + SINR(\sigma_{min}(H))^2/N_t}},$$

where $\sigma_{min}(H)$ is the smallest non-zero singular value of H. An alternate formulation of the modified condition number may include computing the eigen-decomposition of the G matrix (described in section 3.1) to get the eigenvalues $\wedge=(\lambda_1, \ldots, \lambda_{N_t})$ where $$\kappa_{mdf,i}(SINR, H) \triangleq \sqrt{\frac{\lambda_i}{\lambda_1}}.$$

From the definition of G, $\lambda_i$ can be expressed by $$\lambda_i = \frac{1}{1 + SINR(\sigma_i(H))^2/N_t},$$

and hence $(\lambda_1, \ldots, \lambda_{N_t})$ are in ascending order, unlike $(\sigma_1, \ldots, \sigma_{N_t})$. One can also derive a further modified condition number that takes into account the variation in all singular values, rather than the maximum-to-minimum singular-value approach. For instance, $$\kappa_{mdf,avg}(SINR, H) = \sqrt[r-1]{\prod_{i=2}^{r} \kappa_{mdf,i}(SINR, H)}.$$

Note that other metrics that are a function of $\{\kappa_{mdf,i}(SINR, H)\}_{i=2}^r$ are not precluded. For ease of exposition we resort to the former metric $\kappa_{mdf,r}(SINR, H)$ for the remainder of this disclosure.

Modified Orthogonality Defect

A measure of channel orthogonality, called the modified orthogonality defect, is proposed which is a generalization of the conventional notion of orthogonality defect OH) and captures the role of SINR and different antenna array sizes. The modified OD is defined as $$\delta_{mdf}(SINR, H) = \left(\frac{\prod_{i=1}^{N_t} \sqrt{G_{ii}}}{\sqrt{|\det(G)|}}\right)^{1/N_t}.$$

where the matrix G is defined as $$G = \left(I_{N_t} + \frac{SINR}{N_t} H^T H\right)^{-1},$$

and $G_{ii}$ is the i-th diagonal entry of the matrix G. In fact, the modified orthogonality defect is the orthogonality defect for any full-rank matrix B that satisfies $G=B^TB$, which can be constructed, e.g., using the singular-value-decomposition (SVD) or the Cholskey decomposition.

The modified orthogonality defect can be also expressed in terms of the singular values and the singular vectors of the channel. Letting V be the right singular directions of the channel (basically the channel eigenvectors), we can write $$\delta_{mdf}(SINR, H) = \frac{GeoMean\left(\sqrt{(VoV)d^2}\right)}{GeoMean(d)}$$

where VoV denotes the element-wise multiplication of V by itself; $d^2$ denotes the element-wise square of vector d; and the vector d is defined as follows:

$$d = \left[\left(1 + \frac{SINR}{N_t}(\sigma_1(H))^2\right)^{-1/2} \ldots \left(1 + \frac{SINR}{N_t}(\sigma_r(H))^2\right)^{-1/2} \underbrace{1 \ldots 1}_{length(N_t-r)}\right]^T,$$

with r=rank(H). Note that, the first r entries of the vector d, where r=rank(H), are related to the modified condition numbers as follows:

$$[d_1, \ldots, d_r] = \left(1 + \frac{SINR}{N_t}(\sigma_{max}(H))^2\right)^{-1/2} [\kappa_{mdf,1}(SINR, H), \ldots, \kappa_{mdf,r}(SINR, H)].$$

One can verify that, for channels with rank(H)=$N_t$, as SINR grows to infinity, $\delta_{mdf}(SINR, H) \to \delta(H^{-H})$, the standard orthogonality defect for the Hermitian of the inverse or pseudo-inverse of the channel. Note that OH) is not defined when rank(H)<$N_t$.

For any channel matrix H, irrespective of the matrix size or rank, the modified OD is well-defined and satisfies $$\delta_{min} \leq \delta_{mdf}(SINR,H) \leq \delta_{max}$$

where $\delta_{min}=1$ due to the Hadamard inequality, and the right-hand-side inequality can be proved by convex optimization to give $$\delta_{max} = \frac{RMS(d)}{GeoMean(d)}$$

where RMS(d) denotes the root-mean-square operation $$RMS(d) \triangleq \sqrt{\frac{1}{N_t}\sum_{i=1}^{N_t} d_i^2},$$

and GeoMean(d) denotes the geometric mean operation $$GeoMean(d) \triangleq \left(\prod_{i=1}^{N_t} d_i\right)^{1/N_t}.$$

In fact, the lower extreme is achieved when the channel is orthogonal, namely the channel eigenvectors form the identity matrix or a signed permutation thereof. The upper limit is due to a less-known observation that, for a fixed set of channel gains, the maximal (modified) OD is achieved when the channel eigenvectors form a Hadamard/DFT matrix or a signed permutation thereof (after appropriate normalization). We have observed that, for such channels, the IF receiver generally does not offer any rate gain over the MMSE receiver.

Non-square/Asymmetric $N_t \times N_r$ MIMO channels with different number of transmit and receive antennas, $N_t \neq N_r$, have a particular trend of values for the modified OD. For the case $N_t < N_r$ at moderate to high SINR regimes, the MIMO channel is very likely to be almost-orthogonal, unless the antennas spatial correlation is significant. On the other hand, for the case $N_t > N_r$, the MIMO channel is very likely to be far from orthogonal, unless the antennas spatial correlation is significant.

It would be appreciated by one skilled in the art that the above detailed description of the measures including the impact of SINR of the invention is not intended to be exhaustive or to limit the invention to the precise form disclosed above or to the particular field of usage mentioned in this disclosure. While, specific embodiments of, and examples for, the invention are described above for illustrative purposes, various equivalent modifications are possible within the scope of the invention as those skilled in the relevant art will recognize. For example, modifications of the channel singularity measure and the channel orthogonality measure equations with a squaring/n-th power operation, perturbations, adding a regularization factor, linear/geometric averaging of a all/subset of values.

Proposed Algorithm for Receiver Selection

An approach for linear receiver selection in a UE as follows:
  a) Compute the largest modified condition number $\kappa_{mdf,r}$(SINR, H) and the modified orthogonality defect $\delta_{mdf}$(SINR, H) as defined above.
  b) If the channel is very well-conditioned in the sense that $\kappa_{mdf,r}$(SINR, H) is small, then select the MMSE receiver.
  c) If the channel is perfectly orthogonal in the sense that $\delta_{mdf}$(SINR, H) achieves its lower limit (namely 1) or upper limit (namely $\delta_{max}$), then select the MMSE receiver.
  d) If the channel is close to orthogonal in the sense that $\delta_{mdf}$(SINR, H) is close to its lower limit (namely 1) or upper limit (namely $\delta_{max}$), and the channel is not highly ill-conditioned in the sense that $\kappa_{mdf,r}$(SINR, H) is not too large, then select the MMSE receiver.
  e) If the channel is either far from orthogonal in the sense that $\delta_{mdf}$(SINR, H) is far from both its lower and upper limits and/or very ill-conditioned in the sense that $\kappa_{mdf,r}$(SINR, H) is very large, then select the IF receiver.

In summary, the IF receiver is expected to have a meaningful gain over the MMSE receiver when
  the modified OD is sufficiently far from both extremes, namely eigenvectors far from the identity matrix or signed permutations thereof and also far from Hadamard/DFT matrix or signed permutations thereof; and/or
  the largest modified condition number is sufficiently large.

Moreover, the advantage of IF receiver over the MMSE receiver increases as the number of channel directions that have a large modified condition number increases.

A method in a UE for linear receiver selection as follows:
  a) Identify a universal singularity threshold K t h r based on the antenna array size and antenna correlation, etc., but independent of the channel gains and the SINR value.
  b) Identify appropriate orthogonality thresholds $\delta_{low}$, $\delta_{high}$ based on the given or modified condition numbers of the channel and the operating SINR, so that $\delta_{low}=\delta_{low}$(SINR, H) and $\delta_{high}=\delta_{high}$(SINR, H). These are selected as appropriate factors of $\delta_{min}$ and $\delta_{max}$.
  Alternatively, one can define the function:

$$\delta'(\delta_{mdf}, \delta_{min}, \delta_{max}) = \sin\left(\pi \frac{\delta_{mdf}(SINR, H) - \delta_{min}}{\delta_{max} - \delta_{min}}\right),$$

where $0 \leq \delta' \leq 1$. This function approaches a value zero whenever $\delta_{mdf}$(SINR, H) is close to either $\delta_{min}$ or $\delta_{max}$. Hence a unified threshold, $\delta_{thr}$, can be used, such that the IF receiver would be selected if $\delta' > \delta_{thr}$. Note that functions similar in behavior to $\delta'$, which can yield a peak at the center and nulls at the extreme values or vice versa, are not precluded.

c) Compute the largest modified condition number $\kappa_{mdf,r}$(SINR, H) and the modified orthogonality defect $\delta_{mdf}$(SINR, H) as defined above.
  d) If $\kappa_{mdf,r}$(SINR,H)<$\kappa_{thr}$ or ($\delta_{mdf}$(SINR,H)<$\delta_{low}$ or $\delta_{mdf}$(SINR,H)>($\delta_{high}$))

then select the MMSE receiver.
  e) If $\kappa_{mdf,r}$(SINR,H)>$\kappa_{thr}$,and/or ($\delta_{low}$<$\delta_{mdf}$(SINR,H)<$\delta_{high}$)

then select the IF receiver.

It readily follows from the discussion above that the MMSE receiver should generally be selected for low SINR regimes including instances in which SINR is below 0 dB, or even instances in which SINR is below 10 dB. The IF receiver can be more useful for moderate and high SINR regimes.

The MMSE receiver is usually more optimal for non-square/asymmetric uncorrelated MIMO channels with $N_t < N_r$, since the channel is usually almost-orthogonal. On the other hand, for non-square/asymmetric uncorrelated MIMO channels with $N_t > N_r$ at moderate to high SINR, the IF receiver usually meaningfully outperforms the MMSE receiver, since the channel is far from orthogonal. With moderate to high spatial correlation between antennas, however, these implications could change.

Although the conditions mentioned above capture many instances of the MIMO channels for which the IF receiver offers little gain over MMSE, there still appear to be some other combinations of the channel eigenvectors and/or modified condition numbers that can prevent the IF receiver from having significant rate gain over the MMSE receiver.

Note that receiver-type selection can be based on quality metrics other than the modified condition number or the modified orthogonality defect. For instance, quality metrics that are based on the spatial correlation of the channel, or other channel-based metrics are not precluded. In addition, metrics that are channel independent, e.g., network load, can also be used for receiver-type selection.

A New Algorithm for Integer-Forcing Design Based on Eigen-Vector Pairs

An element in our proposed method is combining the strongest channel direction with the other channel directions, one by one, using appropriate weights. The selection of weights lets us adjust the contribution of all eigenvectors to the solution. In particular, we can appropriately align the selected integer vectors for the A matrix based on the strengths of the channel directions. This is both insightful for design and also provides a close-to-optimal solution. The computational complexity is rather low.

In summary, the aspects of the proposed method can include:
  A new method of candidate vector generation via weighted combinations of eigenvector pairs;
  A new, analytically proven, tighter search radius;
  A modified greedy method for the linear independence (LI) test;
  A direct extension of the proposed algorithm for complex MIMO channels (without transforming the complex channel to a real channel via in-phase and quadrature (IQ) decomposition)

Detailed Algorithm for Integer-Forcing Design Based on Eigen-Vector Pairs

The proposed algorithm for finding the integer-linear combinations required for integer forcing (IF) architecture is detailed below.

Inputs: An estimate of the MIMO channel matrix H and the SINR at the receiver; a threshold $\kappa_{thr}$ for identifying weak channel directions; a resolution $RS_\rho$ or size $SZ_\rho$ for the set of $\rho_1$ values; a threshold $Th_\rho$ for the set of $\rho_1$ values, where $\rho_1$ denotes a selected weight for the strongest channel direction Output: A (-n almost-optimal) solution for the A matrix a) Compute the matrix $$G = \left(I_{N_t} + \frac{SINR}{N_t}H^T H\right)^{-1}.$$

b) Compute the eigen-decomposition of the G matrix to get the eigenvalues (in ascending order) $\Lambda=(\lambda_1, \ldots, \lambda_{N_t})$ and the corresponding eigenvectors $V=[v_1 \ldots v_{N_t}]$. Recall from the definition of G above and $\lambda_i$ above that the eigenvector corresponding to the smallest eigenvalue $\lambda_1$ of G is the same as the singular vector $v_1$ corresponding to the largest singular value of the matrix H.

c) Identify the search radius $$\|a\| \leq \varphi \triangleq \sqrt{\left(\max_{i=1,\ldots,N_t} G_{ii}\right)/\lambda_{min}(G)},$$

where $\lambda_{min}(G)=\lambda_1$. A proof of this search radius is given below. To increase the speed, one can also use a tighter, but suboptimal search radius based on the 90-percentile tables below.

d) Identify the set $\{2, \ldots, M\}$ of strong and moderate channel directions, and discard any remaining weak directions. Here M is the maximum index $2 \leq i \leq \text{rank}(H)$ that satisfies $$\kappa_{mdf,i}(SINR, G) \triangleq \sqrt{\frac{\lambda_i}{\lambda_1}} \leq \kappa_{thr};$$

If $\kappa_{mdf,2}(SINR, G) > \kappa_{thr}$, then choose M=2.

e) Form the set of values $\rho_1 \in \Omega_1$ based on the set resolution $RS_\rho$ as follows:

$$\Omega_1 = \{1\} \cup \left\{k \times RS_\rho : k = 0, 1, \ldots, \left\lceil \frac{\min(\varphi, Th_\rho)}{RS_\rho}\right\rceil\right\},$$

which consists of $$\left\lceil \frac{\min(\varphi, Th_\rho)}{RS_\rho}\right\rceil + 2$$

elements; or based on the set size $SZ_\rho$ as follows:

$$\Omega_1 = \{1\} \cup \{k \times Inc : k=0,1,\ldots,SZ_\rho-2\},$$

which has increments of size $$Inc = \left\lceil \frac{\min(\varphi, Th_\rho)}{SZ_\rho - 2}\right\rceil.$$

Below, see multiple remarks about "search interval", "search resolution", "exhaustive selection", and "optimal selection" for $\rho_1$ values.

f) For all direction indices $i=2, \ldots, M$, and for any given $\rho_1 \in \Omega_1$, construct a set of $\alpha$ vectors such that $\alpha=[\rho_1 v_1 + \rho_i v_i]$ where: $[x]$ denotes element-wise rounding with ties rounded up; and $\rho_i \in \Omega_i$ where $$\Omega_i = \left\{\frac{H - \rho_1 v_{t1}}{v_{ti}} : H \in \mathcal{H}, t = 1, \ldots, N_t\right\},$$

with $v_{jk} \triangleq V(j,k)$ and the set of half-integers $$\mathcal{H} \triangleq \left\{\pm\frac{1}{2}, \pm\frac{3}{2}, \ldots, \pm\frac{2\lceil\varphi\rceil+1}{2}\right\}.$$

See remark below about "search interval for $\rho_i$ values".

g) Remove any $\alpha$ vector that falls outside the search radius $\|\alpha\| \leq \varphi$.

h) Put all remaining $\alpha$ vectors into a candidate list.

i) Append the column vectors of the default $I_{N_t}$ matrix, namely all the standard unit vectors, to the candidate list.

j) Sort the candidate list based on their $\alpha^T G \alpha$ values in the ascending order, and discard any repeated $\alpha$ vectors. See Remark below about the usage of "unique sorting" here.

k) Remove any all-zero vectors.

l) Perform the modified greedy LI test to construct the A matrix. See below.

Regarding the search interval for $\rho_1$, the theoretical bound $\|\alpha\| \leq \varphi$ and the fact that eigenvectors have unit length imply that $|\rho_1| \leq \varphi$. Since for any integer vector $\alpha$, the integer vector $(-\alpha)$ is not linearly independent and leads to the same value, $(-\alpha)^T G(-\alpha) = \alpha^T G\alpha$, we can limit the selection to only $0 \leq \rho_1 \leq \varphi$. Even more, one can limit the upper bound to the 90-percentile radius, mentioned below, or a small factor thereof (e.g., two times the 90-percentile radius), without loss of optimality in most cases, but perhaps with some rate performance degradation for certain very ill-conditioned and non-orthogonal channels.

Regarding the search resolution for $\rho_1$, the selection of $\rho_1$, in many cases, can be done by considering only a very low precision of values in the search interval, e.g., only integer, half-integer, or quarter-integer values. This increases the search speed and lowers the complexity of the algorithm, although may sometimes sacrifice the performance and/or lead to long integer $\alpha$ vectors, which might not be practically favorable. We have also observed a saturation effect for our algorithm when applied to certain channels, where irrespective of how low or high of a resolution is chosen for the $\rho_1$ search, the performance does not improve beyond a certain level (which might be efficient enough to realize, e.g., 90% of the IF-optimal performance). Therefore, increasing $\rho_1$ precision is not necessarily a good idea.

Regarding the exhaustive selection of $\rho_1$, one can better ensure a more exhaustive search over all necessary $\rho_1$ values based on half-integer intersection points of all pairs of eigenvector combinations. In particular, for a fixed direction index $2 \leq i \leq M$, one can consider the solution to $\rho_1$ in the linear system of equations:

$$\begin{cases} \rho_1 v_{j1} + \rho_i v_{ji} = H_1 \\ \rho_1 v_{k1} + \rho_i v_{ki} = H_2 \end{cases}$$

for all pairs $1 \leq j \neq k \leq N_t$ and all half-integer pairs $H_1, H_2 \in \mathcal{H}$. One can do this in a more systematic way using a "hyperplane arrangement" method. In either form, such an exhaustive selection usually involves higher computational complexity and longer running time, compared to the simple uniform selection proposed above, but only offers low to moderate improvement in the rate performance.

Regarding the optimal selection of $\rho_1$, an optimal/smart selection of $\rho_1$ value can be based on (modified) condition number, (modified) orthogonality defect, etc. For example, for the 2×2 real MIMO channel, ($\rho_1=1$) might be used when channel gains or modified condition numbers are small and the orthogonality or modified orthogonality defect is close to its lower or upper limits.

Regarding the search interval for $\rho_i$, again, the theoretical bound $\|\alpha\| \leq \varphi$ and the fact that eigenvectors have unit length imply that $$|\rho_i| \leq \sqrt{\varphi^2 - \rho_1^2}.$$

At least in some cases, a tighter bound $$|\rho_i| \leq \sqrt{(\varphi^2 - \lambda_1 \rho_1^2)/\lambda_i}$$

can be used. Either bound can help avoid generating at least some of the invalid integer $\alpha$ vectors and therefore avoid at least part of the invalid-pruning operation in Step g) of the algorithm.

Regarding the no need for sorting $\rho_i$ values, the step in the "Perturbation of Eigenvectors" algorithm, corresponding to Method 10, explained above, which says "sort the $\rho_i$ values and use the average of consecutive $\rho_i$ values for constructing the integer a vectors" may be unnecessary.

Regarding the unique sorting of a vectors, one technique to increase the speed of the proposed algorithm is a "unique sorting" simplification in step (j) of the algorithm, as follows: One can sort the candidate list of the integer $\alpha$ vectors based on their $\alpha^T G \alpha$ values and then discard all those vectors that achieve the same a T Ga value, except for one. This can be helpful in the cases where inappropriately high resolution for the selection of $\rho_1$ values leads to many repetitions in the candidate list of integer $\alpha$ vectors. This technique lowers the computational complexity, as checking for repeated scalars is much easier than checking for repeated vectors. However, this technique also potentially incurs a performance loss, since there is a relatively small chance that two or multiple distinct linearly independent integer a vectors achieve the same $\alpha^T G \alpha$ value, some of which will be discarded by such a "unique sorting" procedure.

Regarding the explicit formulas, from the above, the proposed algorithm is general enough to facilitate a potential lattice reduction as an outer procedure, as discussed below. Therefore, explicit formulas have been avoided. In this remark, we provide these explicit formulas in case such lattice reduction is not performed. Here, we denote r=rank (H).

$$\Lambda = (\lambda_1, \ldots, \lambda_{N_t}) =$$

-continued
$$\left[\left(1 + \frac{SINR}{N_t}(\sigma_1(H))^2\right)^{-1} \ldots \left(1 + \frac{SINR}{N_t}(\sigma_r(H))^2\right)^{-1} \underbrace{1 \ldots 1}_{size\ (N_t-r)}\right]^T;$$

$$\varphi \triangleq \sqrt{\left(\max_{i=1,\ldots,N_t} G_{ii}\right) / \lambda_{min}(g)} = \sqrt{\max_{i=1,\ldots,N_t} G_{ii}} \times \sqrt{1 + \frac{SINR}{N_t}(\sigma_{max}(H))^2};$$

$$\kappa_{mdf,i}(SINR, G) \triangleq \sqrt{\frac{-\lambda_i}{\lambda_1}} = \sqrt{\frac{1 + SINR(\sigma_1(H))^2/N_t}{1 + SINR(\sigma_i(H))^2/N_t}}, i = 1, \ldots, r.$$

Regarding the LLL Pre- and Post-Processing, UE can potentially decrease the search running time by performing an LLL reduction as an outer layer for the proposed algorithm.

In particular, once matrix G has been computed in Step (a), we can perform the following preprocessing:

Consider the lattice basis B that satisfies $G=BB^T$, e.g., B=L where L is the lower triangular matrix from the Cholskey decomposition $G=LL^T$; or $B=V(diag(\wedge))^{1/2}$ from the eigendecomposition $G=Vdiag(\wedge)V^T$.

Apply an LLL-reduction to B to get the reduced lattice basis $\tilde{B}=BT$, with the unimodular matrix T, then form the reduced Gram matrix $\tilde{G}=\tilde{B}\tilde{B}^T$.

While the rest of the algorithm is running, namely Steps (b) through (1), consider the following changes:

Replace the matrix G with the matrix $\tilde{G}$. Call the resulting solution the $\tilde{A}$ matrix.

At the end of the algorithm, perform the following post-processing:

Convert the result back to one for the original lattice using $A=T\tilde{A}=B^{-1}\tilde{B}\tilde{A}$.

A New Search Radius for Integer-Forcing

A new, tight theoretical bound on the search radius of the Integer Forcing problem can be obtained and used as follows.

From the min-max theorem, we have for any vector $\alpha_m$, including the optimal one, that $$\alpha_m^T G \alpha_m \geq \lambda_{min}(G) \|\alpha_m\|^2,$$

where $\lambda_{min}(G)$ denotes the minimum eigenvalue of the matrix G. On the other hand, we know $A=I_{N_t}=[e_1, \ldots, e_{N_t}]$ is a valid (but not necessarily optimal) solution for this optimization problem. Here we have used the notation $e_m$ for the standard unit vector with 1 in the m-th position and zero elsewhere. Therefore, we have $$\min_{\substack{A=[a_1 \ldots a_{N_t}] \\ integer, full\ rank}} \max_{m=1,\ldots,N_t} a_m^T G a_m \leq \max_{m=1,\ldots,N_t} e_m^T G e_m = \max_{i=1,\ldots,N_t} G_{ii}.$$

Putting the two inequalities together, we obtain the following formula for the IF search radius:

$$\|a_m\| \leq \sqrt{\frac{\max_{i=1,\ldots,N_t} G_{ii}}{\lambda_{min}(G)}}.$$

For the particular choice of $$G = \left(I_{N_t} + \frac{SINR}{N_t} H^T H\right)^{-1},$$

we have $$\lambda_{min}(G) = \left(1 + \frac{SINR}{N_t}(\sigma_{max}(H))^2\right)^{-1}.$$

Therefore, the bound above simplifies to $$\|a_m\| \leq \sqrt{\max_{i=1,\dots,N_T} G_{ii}} \times \sqrt{1 + \frac{SINR}{N_t}(\sigma_{max}(H))^2}.$$

To the best of our knowledge, these formulas for the search radius are not reported before in the literature. These formulas tend to be particularly useful for symmetric MIMO channels, when eNB and UE have equal number of antennas, with low spatial correlation. Based on our numerical evaluations, it appears that, for small values of modified condition number (when A=I is almost optimal), the proposed search radius is actually relatively tight. However, as the modified condition number increases and the optimal A matrix moves away from A=I (the regime where IF is more useful), this bound becomes rather loose. Nevertheless, this is still relatively tighter than the existing formulas for the search radius.

Numerical Tables for Search Radius for Integer-Forcing

In this subsection, we provide a set of tables for the 90-percentile of the IF search radius. We have generated the following tables based on numerical simulation of hundreds of uncorrelated and correlated real MIMO channels, and extracted the search radius based on the 90-percentile of the norm of the actually selected integer a vectors by the optimal exhaustive selection method. For correlated MIMO channels, we have used the definitions and parameters introduced in 3GPP TS 36.101 Annex B.2.3 (and its extension for larger antenna array sizes) as follows:

$$H = \text{reshape}(L_{spat} * \text{vec}(H_{iid}), [N_r, N_t]) \text{ where } R_{spat} = R_{eNB}$$
$$\otimes R_{UE} = L_{spat} L_{spat}^T$$

where: vec(H) converts the matrix H into a vector by column-wise stacking; reshape(h, [m, n]) converts the vector h into an m×n matrix by column-wise unfolding; $\otimes$ denotes the Kronecker product for matrices; $R_{eNB}$ and $R_{UE}$ are respectively $N_t \times N_t$ and $N_r \times N_r$ correlation matrices at the eNB and UE, as follows:

$$R_{eNB} = [\alpha^{(i-j)^2/(N_t-1)^2}]_{i,j} \text{ and } R_{UE} = [\beta^{(i-j)^2/(N_r-1)^2}]_{i,j}$$

with correlation parameters $0 \leq \alpha \leq 1$ and $0 \leq \beta \leq 1$; and $R_{spat} = L_{spat} L_{spat}^T$ is the Cholskey decomposition of the MIMO correlation matrix $R_{spat}$. For some medium and high correlation cases, to better ensure that the spatial correlation matrix is positive semi-definite after round-off to 4 digit precision, an adjustment is made as follows:

$$R_{spat} \leftarrow \frac{R_{spat} + aI_{N_t N_r}}{1 + a},$$

for some small scaling factor such as $\alpha = 0.00010$ or $\alpha = 0.00012$.

These tables tend to be more useful for asymmetric MIMO channels, with unequal numbers of eNB and UE antennas, or when MIMO spatial correlation is high.

These tables also suggest that, if there is any gain for using IF over MMSE receiver based on other characteristics of the channel, it will more likely appear for average normalized receive signal-to-interference-plus-noise ratio SINR/N t exceeding 0 dB.

For complex MIMO channels, one should consider twice the array size (e.g. convert a 2×2 complex channel to a 4×4 real channel) and then use the tables provided in FIGS. 4-12. As provided in 3rd Generation Partnership Project (3GPP) Technical Specification (TS) 36.101, "User Equipment (UE) radio transmission and reception", 3GPP Technical Specification, LTE, Radio Access Network, Evolved Universal Terrestrial Radio Access (E-UTRA) (see section B.2.3.2 in the Annexes), FIG. 4 illustrates a table 400 providing a MIMO correlation settings matrix at high, medium and low levels including a corresponding value for each of a transmit correlation parameter a and a receive correlation parameter β for ULA MIMO correlation matrices.

FIG. 5 illustrates a numerical table 500 for an integer-forcing search radius for 2×2 real MIMO. The table includes a respective value associated with each of multiple correlation values, and SINR/N t values. FIG. 6 illustrates a numerical table 600 for an integer-forcing search radius for 2×4 real MIMO. FIG. 7 illustrates a numerical table 700 for an integer-forcing search radius for 4×2 real MIMO. FIG. 8 illustrates a numerical table 800 for an integer-forcing search radius for 4×4 real MIMO. FIG. 9 illustrates a numerical table 900 for an integer-forcing search radius for 2×8 real MIMO. FIG. 10 illustrates a numerical table 1000 for an integer-forcing search radius for 8×2 real MIMO. FIG. 11 illustrates a numerical table 1100 for an integer-forcing search radius for 4×8 real MIMO. FIG. 12 illustrates a numerical table 1200 for an integer-forcing search radius for 8×4 real MIMO.

A Modified Greedy Algorithm to Find Linearly Independent Vectors

In this subsection, we provide a modified greedy method with labeled counters for finding a set of linearly independent vectors from a sorted candidate list. First, we explain the basic greedy method for the LI test. Next, we present the modification with labeled counters that speeds up the basic greedy method via tree-like considerations and avoids testing certain already-failed combinations.

In the following, we explain the basic greedy method for the LI test.

We start from the top of the sorted list, fix the $N_r$-th vector in the sorted candidate list as a column of the A matrix (since the IF performance is dictated by the longest vector), and consider the sub-list consisting of vectors indexed 1 through $N_r-1$. Then we check the LI condition for the current A matrix with the last vector in the sub-list; if it passes the LI check, append it as a column of the A matrix, and otherwise discard it. We proceed similarly checking the second-to-last, third-to-last, etc., vectors in the sub-list one by one. We continue until either a set of $N_t$ vectors satisfying the LI condition is found, or all vectors in the sub-list are checked but have not formed a full-rank A matrix, in which case we go one more step down in the candidate list, change the fixed vector to $(N_r+1)$st vector, and repeat the same procedure as before. We proceed similarly until a set of $N_t$ vectors satisfying the LI condition is found. The algorithm will output a solution in finite time, since we have included the identity matrix in the candidate list, which is a valid, worst-case solution.

The basic greedy LI test method can be inefficient, since it fixes and updates the starting vector in the sub-list for the LI test, rather than the ending vector, which in general may not be optimal.

Below, we explain the modifications to the basic greedy method using labeled counters.

In the basic method explained above, in each step, we start from a fixed vector in the list and traverse the candidate list in the reverse order, namely, to the top of the list, searching for a full-rank collection of vectors. However, some of these vector collections have been already tested and are known to fail the LI test. Therefore, we can store indices of some or all of the failed collections to speed up the upcoming checks. However, storing all such failed collections might be very space-consuming, and possibly time-consuming. In at least some instances, we propose to only store pairs of failed collections in the following convenient form: For the k-th integer vector $\alpha(k)$ in the candidate list, set a counter $c(k)$ that points to the next vector to be collected and checked. Initially all counters are set as $c(k)=k-1$, since the basic greedy search always traverses the candidate list in the reverse order and checks the previous vector in the list. However, we make modifications to the counters as follows: Whenever $a(k)$ is the fixed vector in a step and its collection with $\alpha(l)$, for some $2 \leq l < k$, fails the LI test, update the counter to $c(k)=l-1$. This is because we perform the LI test in order, so if the pair $[\alpha(k), \alpha(l)]$ fails the LI test, it means that all pairs $[\alpha(k), \alpha(l+1)], \ldots, [\alpha(k), \alpha(k-1)]$ have already failed as well, so the next collection to be checked is $[\alpha(k), \alpha(l-1)]$. Such a counter becomes useful when the fixed vector in the sub-list is changed, since it helps to better ensure that those failed vector pairs will not be included in any upcoming collections.

A Generalization of the Proposed Algorithm for Complex MIMO Channels

In this subsection, we provide a generalized version of the proposed algorithm for complex MIMO channels. There are two approaches to IF receiver design for complex MIMO channels, both of which lead to the same performance:

(i) The common approach, is to apply an I-Q decomposition to an $N_t \times N_r$ complex MIMO channel and transform it to an equivalent $(2N_t \times 2N_r)$ real MIMO channel and then use the proposed algorithm for this equivalent real channel. This approach generates a real-integer A matrix of size $(2N_t \times 2N_r)$. In this case, for the IF architecture to work, identical and independent MCS should be used for both real and imaginary parts, so complex or joint MCS that is not a cross product of the real and imaginary components is not allowed in this approach.

(ii) The less-common approach is to directly work with the complex channel and use a complex-integer A matrix of size $N_t \times N_r$, namely a matrix whose entries are of the form $(\alpha+jb)$ with a and b being real integers; this is also called a Gaussian integer. This is a more natural approach and one might get some complexity reduction with this approach. In addition, in this approach, we are allowed to use the more common complex or joint MCS for both I-Q parts, which simplifies the transmitter design. Also, note that, the same power level per antenna per dimension for the complex MIMO channel should be used as that for the real MIMO channel.

In the following, we explain the changes to our proposed algorithm that enable a direct design for complex MIMO channels. The noted aspects are: using the conjugate transpose instead of the real transpose, so the G matrix is defined as $$G = \left(I_{N_t} + \frac{SINR}{N_t} H^H H\right)^{-1};$$

the weight factors $\rho_1, \ldots, \rho_r$ are now complex scalars; and finally the rounded vectors jump to new values when either their real or their imaginary arguments take on a half-integer value. Therefore, considering the G matrix as mentioned above, all the steps in the algorithm stay the same (including a possible LLL pre- and post-processing), except for Steps e) and f) which are modified as follows:

a) Form the set of $\rho_1 \in \Omega_1$ values based on the set resolution RS $\rho$ as follows:

$$\Omega_1 = \{1, j\} \cup$$

$$\left\{(k*RS_\rho + jl*RS_\rho) : k \in \mathbb{Z}^{\geq 0}, l \in \mathbb{Z}^{\geq 0}, \sqrt{k^2+l^2} \leq \left\lceil \frac{\min(\varphi, Th_\rho)}{RS_\rho}\right\rceil \right\}.$$

b) For all direction indices i=2, ..., M, and for any given $\rho_1 \in \Omega_1$, construct a set of a vectors such that $\alpha_i = [\rho_1 v_1 + \rho_i v_i]$ where: $[x]$ denotes element-wise rounding with ties rounded up; and $\rho_i \in \Omega_{i,Real} \times j\Omega_{i,Imag}$ with $$\Omega_{i,Real} = \left\{\frac{H - Real\{\rho_1 v_{t1}\}}{Real\{v_{ti}\}} : H \in \mathcal{H}, t=1, \ldots, N_t\right\},$$

$$\Omega_{i,Imag} = \left\{\frac{H - Imag\{\rho_1 v_{t1}\}}{-Imag\{v_{ti}\}} : H \in \mathcal{H}, t=1, \ldots, N_t\right\},$$

where we have denoted $v_{lk} \triangleq V(l, k)$ and the set of half-integer $$\mathcal{H} \triangleq \left\{\pm\frac{1}{2}, \pm\frac{3}{2}, \ldots, \pm\frac{2\lceil\varphi\rceil+1}{2}\right\}.$$

Implementation Aspects for IF Receiver

Coded Modulation Aspects

Introduction to IF Settings

There are two highlighted implementation settings for IF receiver:

The real setting, where only real channel is considered and real lattice operations are applied. A complex channel is converted to a virtual real channel using I-Q decomposition.

The complex setting, where complex channel is directly considered and complex lattice operations are employed.

The lattice used for IF receiver, in turn, can be constructed in at least two ways:

Construction A: coded modulation via (single-level) non-binary codes Construction D: coded modulation via multi-level binary codes We are more interested in binary codes, such as linear block codes, convolutional codes, turbo codes, LDPC codes, polar codes, so in at least some instances prefer Construction D.

For the case of real settings with Construction D, the following features/aspects are considered:

The virtual real channel has (2×M) transmit antennas and (2×N) receive antennas. The channel is assumed to experience semi-static, flat fading, i.e., no or almost no time/frequency variation within a codeblock transmission. This may be achieved by constraining the mapping of the modulation symbols to be within a resource allocation comprising small number (e.g., 1) of RBG (Resource Block Groups, RBG=4RBs, RB=12 subcarriers), subband (e.g., 8 RBs), PRG (Precoding Resource Group, such as 2 RBs). The resource allocation may span at least a slot (e.g., comprising 14 OFDM symbols) or multi-slot allocation to support sufficient number of information bits for communication due to limited number of subcarriers in frequency for flat fading constraint.

All messages and codewords are binary.

All codes (i.e., encoder and decoder functions) are binary linear codes.

There are (M×2×L) independent messages/codewords, where L is the number of levels for the multi-level code. The codewords may correspond to encoded portions of one or more transport block. A transport block may be segmented to multiple codeblocks, each codeblock encoded with a channel code to a codeword. The number of channel coded bits in a codeword may be given by the number of data subcarriers (e.g., excluding subcarriers used for reference signals, rate-matching pattern) in the resource allocation.

All (M×2) messages in the same level use the same binary code with the same rate. Code rate for each level is selected based on one of the different rules for multi-level coding scheme. The number of information bits (of a transport block), and the number of coded bits or codeword length is the same across all codewords in the same level. In one example, the codewords may be mapped first to the bits corresponding to a given level and antenna port (e.g., starting from the lowest level, lowest antenna port, I and Q component alternating or I component first and Q component) and then across antenna ports (e.g., lowest antenna port to highest antenna port), and then across levels (e.g., to the second lowest level, third lowest level, and so on.)—so across antenna port (I and Q alternating or I first then Q) first (starting from the lowest level) and then levels. Alternate mappings can also be considered such as across levels (I and Q alternating or I first then Q) (starting from the lowest antenna port) and then across antenna ports. The antenna ports may correspond to a transmission layer. Also, the case where the same codeword is mapped to a subset of antenna ports of size greater than one is not precluded under certain spatial correlation conditions.

For modulation of binary sequences, messages are concatenated in the order of their level, i.e., MSBs correspond to the highest level (level 1') and LSBs correspond to the lowest level (level 1).

Mapping from bits to symbols follows natural labeling, i.e., Cartesian product of mappings for each level, where mapping for each level is a mapping of $\{0,1\}$ to BPSK symbols such as $\{+1, -1\}$ or $\{+a, -a\}$.

OFDM allocates modulated symbols first over frequency (sub-carriers), then across time (OFDM symbols). In the disclosure, the parameter 'n' refers to the total number of time-frequency allocations.

The effective channel matrix 'A' should be: (i) real integer, (ii) its modulo-2 version '$A_2$' should be full-rank over $Z_2$.

Figure 13:
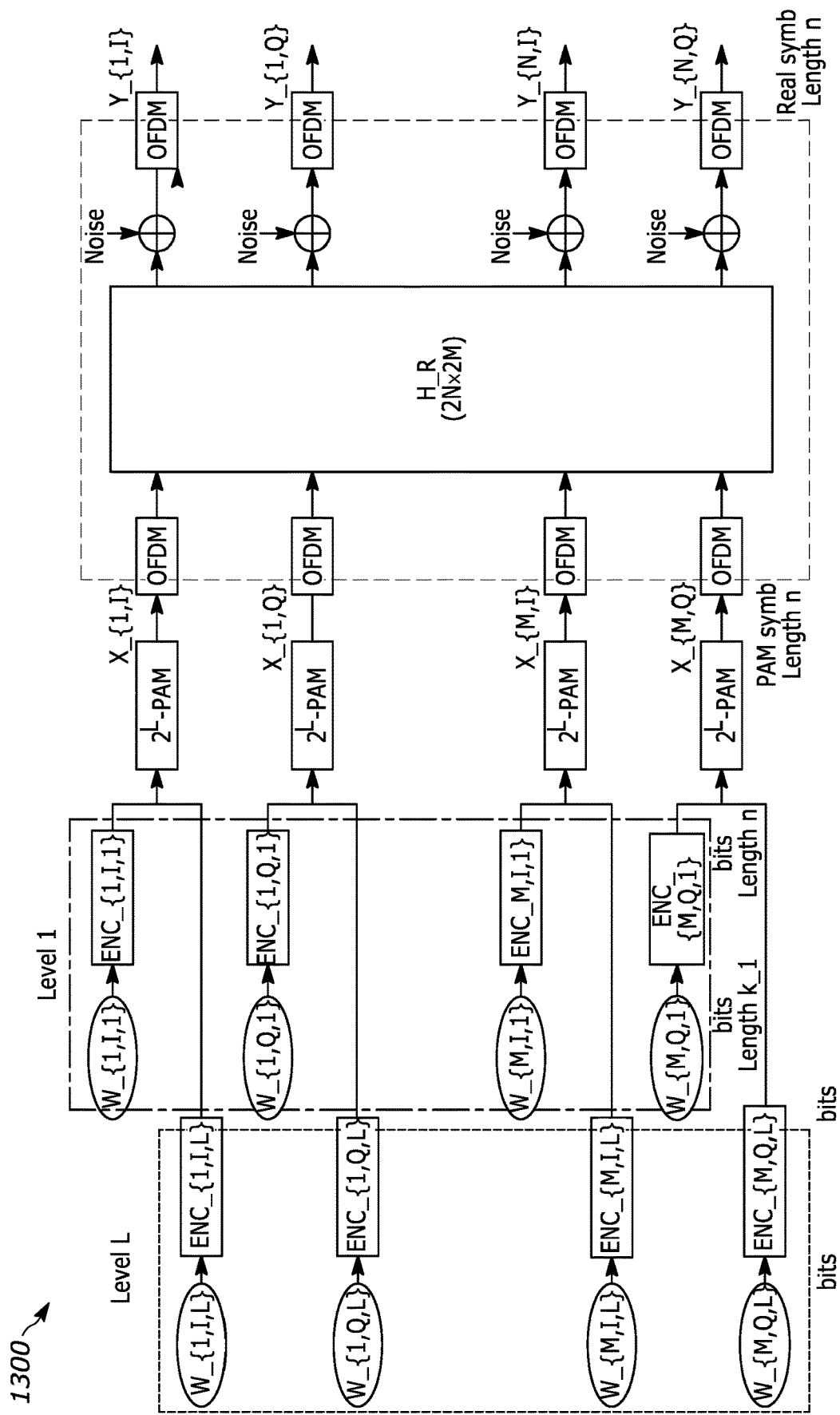
FIG. 13 is a transmitter side block diagram structured using real setting with construction D.
Figure 14:
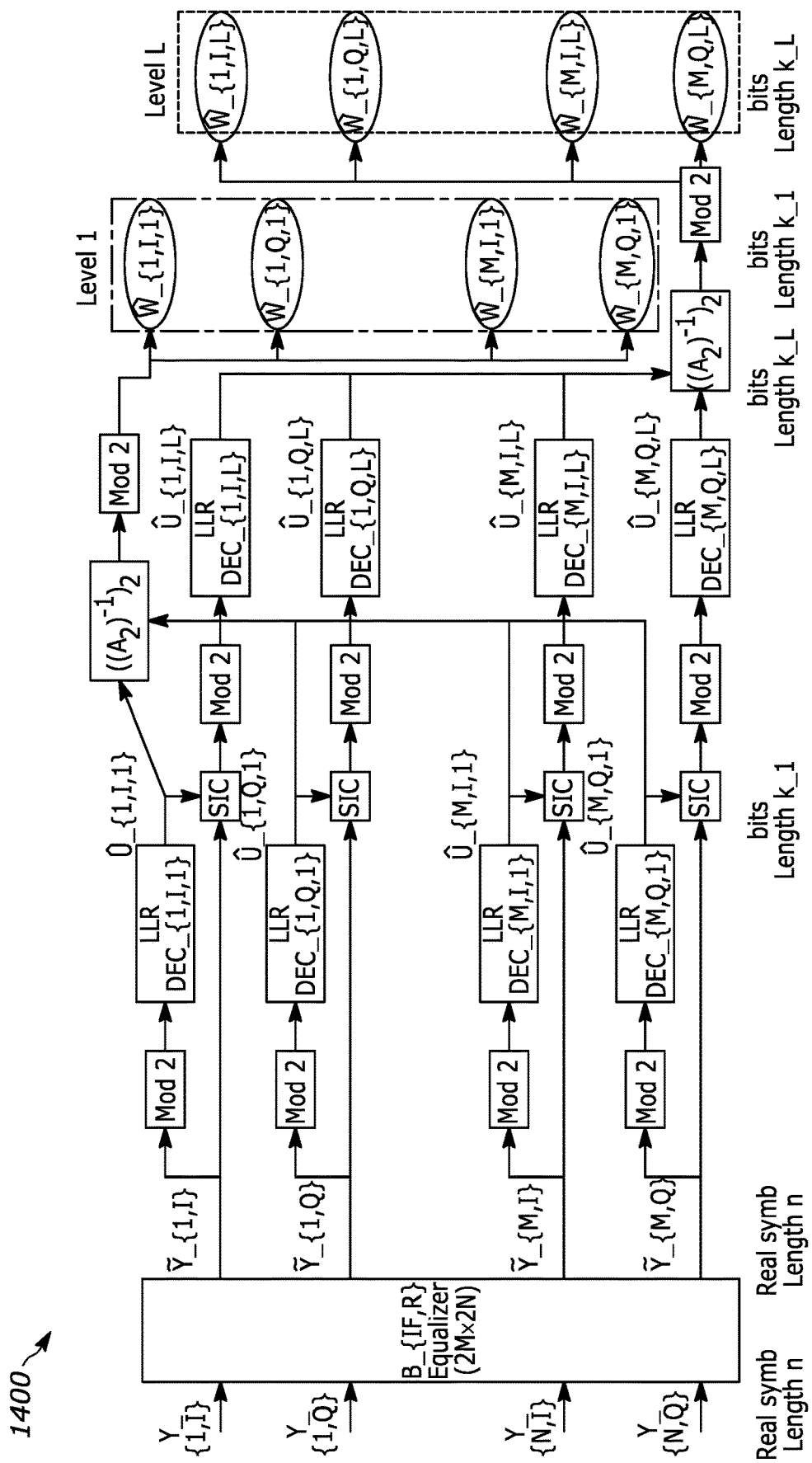
FIG. 14 is a receiver side block diagram structured using real setting with construction D.

FIGS. 13 and 14 show how the transmitter and receiver sides are structured when using Real Setting with Construction D. More specifically, FIG. 13 illustrates a transmitter side block diagram 1300 structured using real setting with construction D including Channel H, and receiver noise and OFDM demodulation, and FIG. 14 illustrates a receiver side block diagram 1400 structured using real setting with construction D.

For the case of complex settings with Construction D, the following features/aspects are considered:

The complex channel has (M) transmit antennas and (N) receive antennas. The channel is assumed to experience semi-static, flat fading, i.e., no or almost no time/frequency variation within a codeblock transmission. This may be achieved by constraining the mapping of the modulation symbols to be within a resource allocation comprising small number (e.g., 1) of RBG (Resource Block Groups, RBG=4RBs, RB=12 subcarriers), subband (e.g., 8 RBs), PRG (Precoding Resource Group, such as 2 RBs). The resource allocation may span at least a slot (e.g., comprising 14 OFDM symbols) or multi-slot allocation to support sufficient number of information bits for communication due to limited number of subcarriers in frequency for flat fading constraint.

All messages and codewords are binary.

All codes (i.e., encoder and decoder functions) are binary linear codes.

There are (M×L) independent messages/codewords, where L is the number of levels for the multi-level code. The codewords may correspond to encoded portions of one or more transport block. A transport block may be segmented to multiple codeblocks, each codeblock encoded with a channel code to a codeword. The number of channel coded bits in a codeword may be given by the 2*number of data subcarriers (e.g., excluding subcarriers used for reference signals, rate-matching pattern) in the resource allocation. The factor of 2 for a complex (I and Q) modulation symbol.

All (M) messages in the same level use the same binary code with the same rate. Code rate for each level is selected based on one of the different rules for multi-level coding scheme. The number of information bits (of a transport block), and the number of coded bits or codeword length is the same across all codewords in the same level. In one example, the codewords may be mapped first to the bits corresponding to a given level and antenna port (e.g., starting from the lowest level, lowest antenna port, I and Q component alternating or I component first and Q component) and then across antenna ports (e.g., lowest antenna port to highest antenna port), and then across levels (e.g., to the second lowest level, third lowest level, and so on.)—so across antenna port (I and Q alternating or I first then Q) first (starting from the lowest level) and then levels. Alternate mappings can also be considered such as across levels (I and Q alternating or I first then Q) (starting from the lowest antenna port) and then across antenna ports. The antenna ports may correspond to a transmission layer. Also, the case where the same codeword is mapped to a subset of antenna ports of size greater than one is not precluded under certain spatial correlation conditions.

For modulation of binary sequences, messages are concatenated in the order of their level, i.e., MSBs correspond to the highest level (level 1') and LSBs correspond to the lowest level (level 1).

Mapping from bits to symbols follows natural labeling, i.e., Cartesian product of mappings for each level, where mapping for each level is a mapping of $\{0,1\}$ to BPSK symbols such as $\{+1, -1\}$ or $\{+a, -a\}$ for both I and Q components.

OFDM allocates modulated symbols first over frequency (sub-carriers), then across time (OFDM symbols). In the disclosure, the parameter 'n' refers to the total number of time-frequency allocations.

The effective channel matrix 'A' should be: (i) complex integer, (ii) its modulo-2 version '$A_2$' should be full-rank over $Z_2$.

Define the multiplication of complex integer matrix 'A' with a binary sequence & modulo-2 operation for complex integers/bits.

In one example, for equivalence with the real setting, each message can be considered to be composed of two sub-messages (for the I and Q components).

Figure 15:
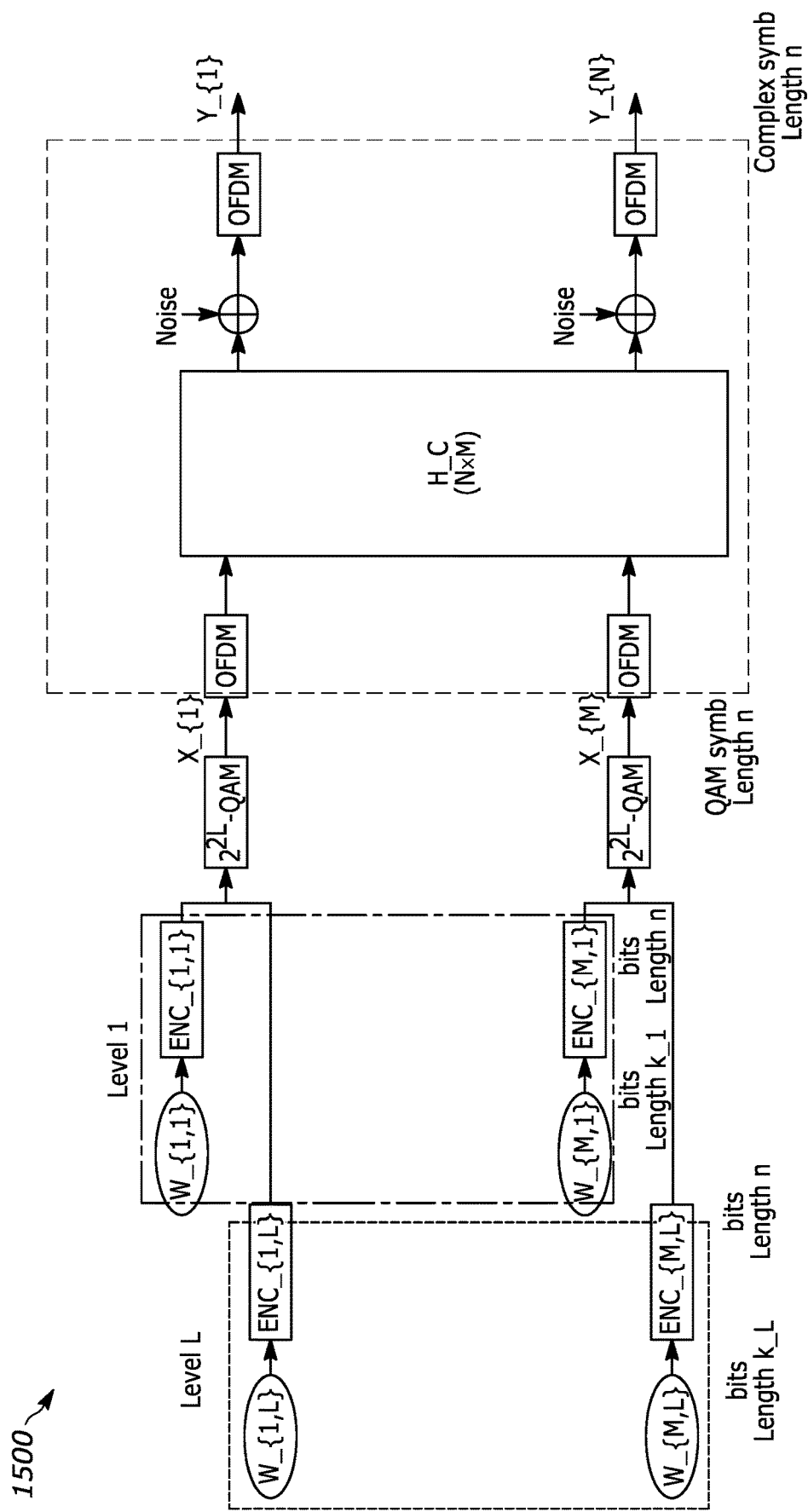
FIG. 15 is a transmitter side block diagram structured using complex setting with construction D.
Figure 16:
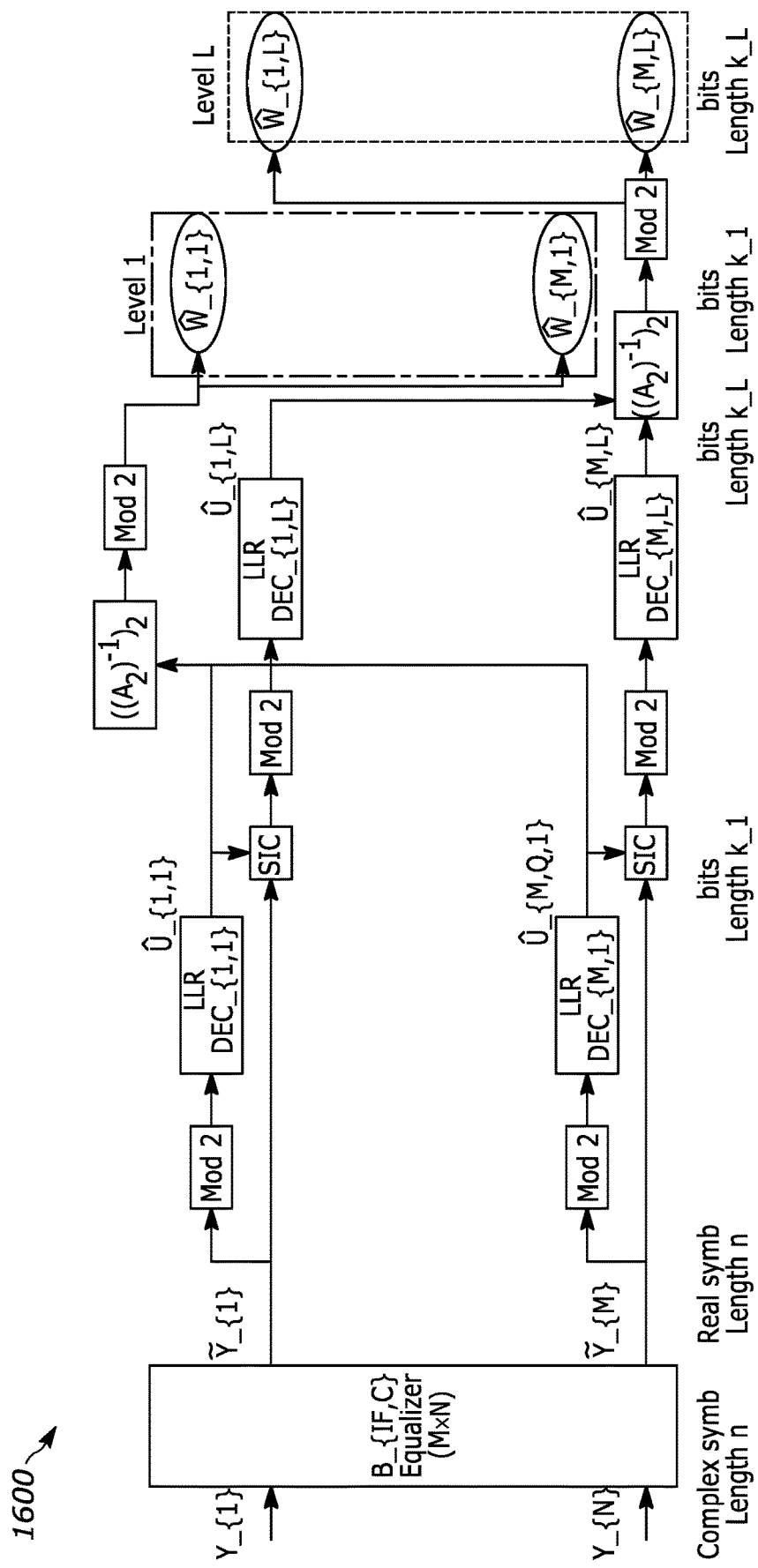
FIG. 16 is a receiver side block diagram structured using complex setting with construction D.

FIG. 15 illustrates a transmitter side block diagram 1500 structured using complex setting with construction D. FIG. 16 illustrates a receiver side block diagram 1600 structured using complex setting with construction D.

We would also like to note that, a further setting is based on:
lattice-reduction aided (LRA) receivers, which apply IF-like operation on a symbol level (rather than a code-word level), along with
the application of an outer single-level/multi-level channel code This can be also discussed for both real/complex settings.

For the case of real settings with Construction A, the following features/aspects are considered:

For consistency we start with binary messages. Operations are done with respect to an order-p field.

Codeword is p-ary. Integer matrix is applied at the receiver to the order-p function of messages.

All streams or layers have the same rate. This restriction can be relaxed under certain arrangements.

The input/output relation at the decoding stage is unconventional.

At transmitter: $k \leq k_b$ and $k \leq n$ but not necessarily $k_b \leq n$, code rate can be larger than 1.

OFDM allocates modulated symbols first over frequency or sub-carriers, then across time or OFDM symbols. In the figures, the parameter 'n' refers to the total number of time-frequency allocations.

Extension to complex-valued channels: virtual (2M×2N) MIMO channel, i.e., double the number of streams.

Figure 17:
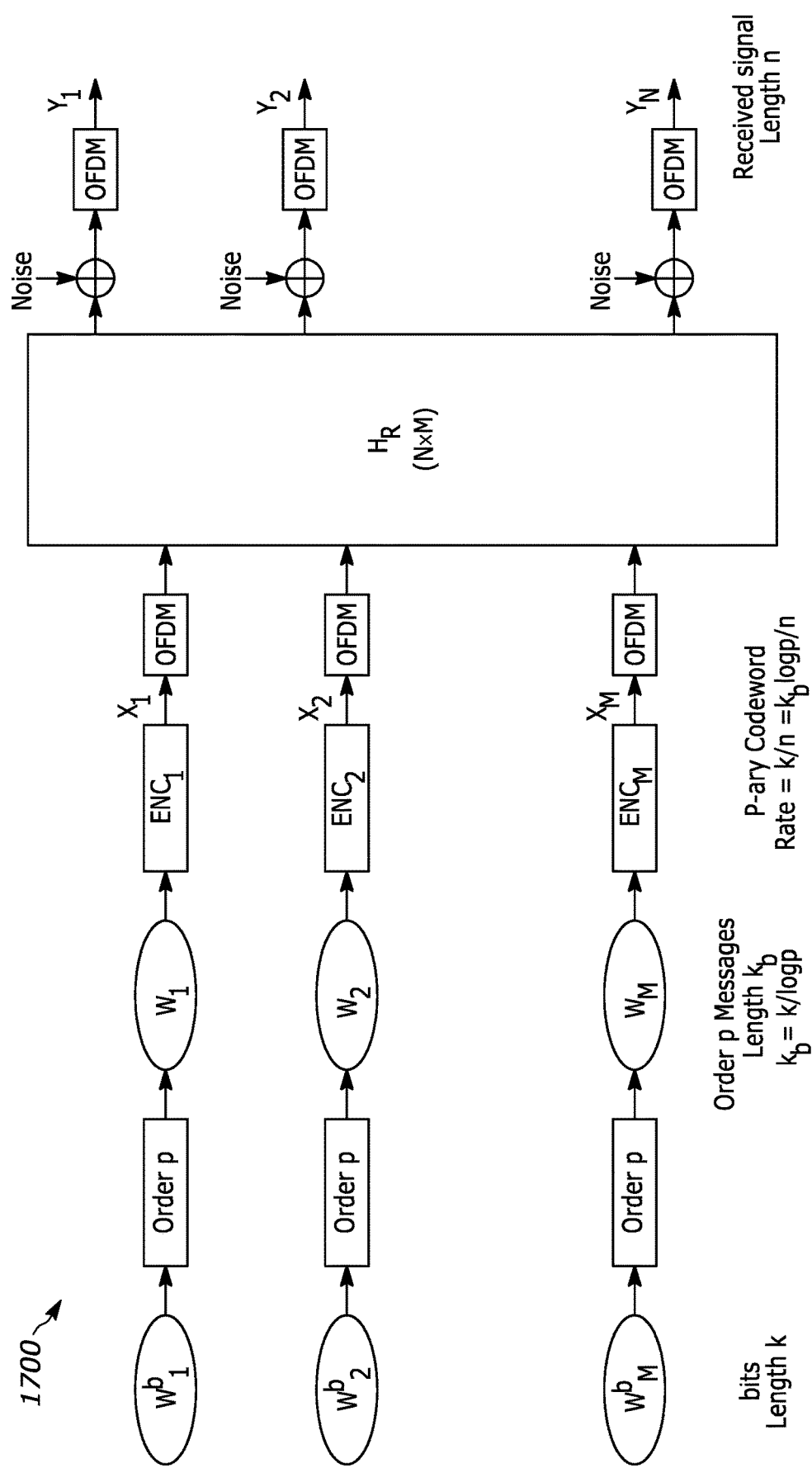
FIG. 17 is a transmitter side block diagram structured using real setting with construction A.
Figure 18:
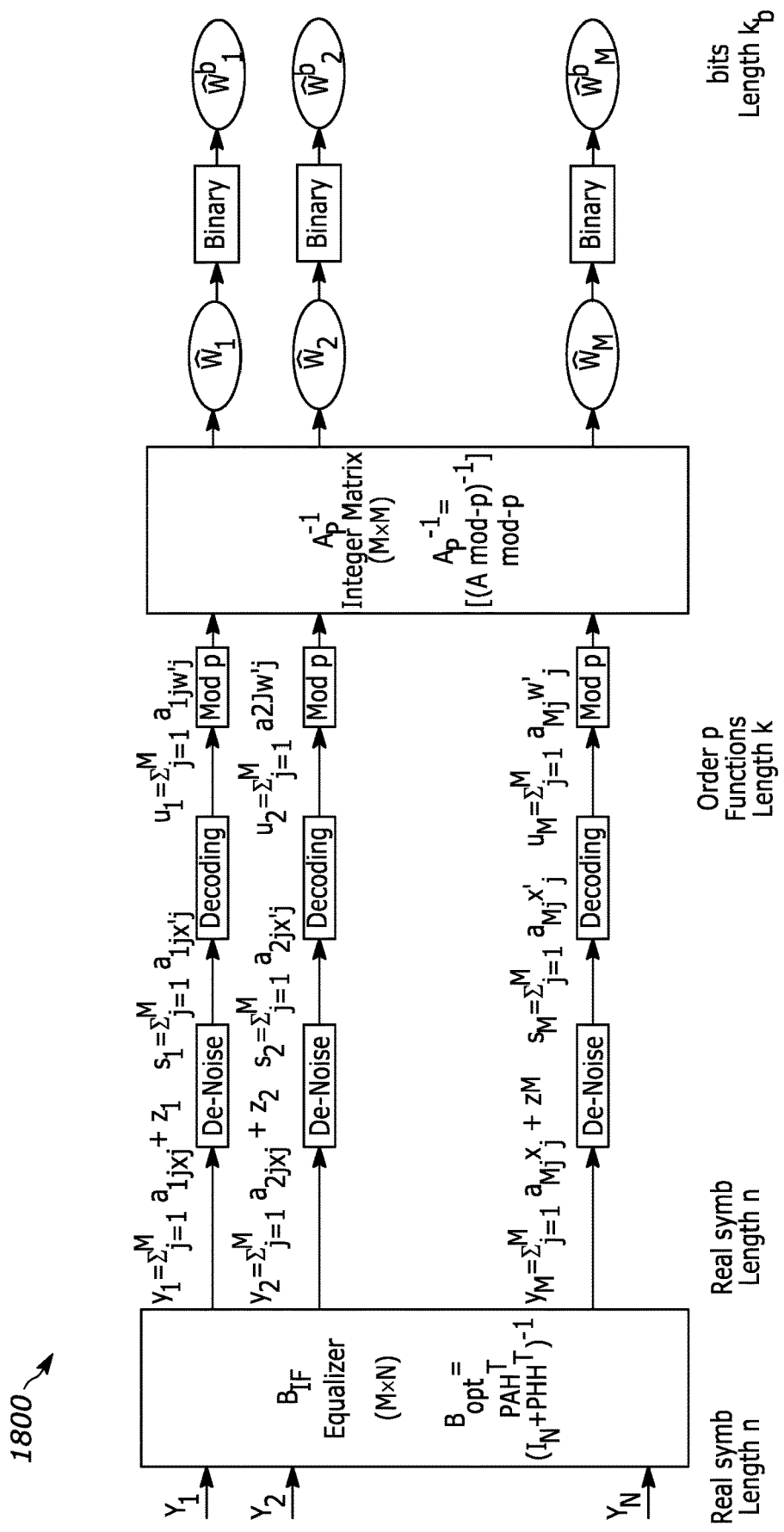
FIG. 18 is a receiver side block diagram structured using real setting with construction A.

FIG. 17 illustrates a transmitter side block diagram 1700 structured using real setting with construction A. FIG. 18 illustrates a receiver side block diagram 1800 structured using real setting with construction A.

As a reference, the codeword-to-layer mapping in LTE, at least for code-book-based operation, is here reminded as background material:

A maximum of 4 layers (8 layers in Rel. 15) are allowed. $N_L$ layers, $N_A$ ports, where $1 \leq N_L \leq N_A$.

Possible transport-block-to-layer mappings are shown below.

For HARQ retransmissions, if 1 transport block spans 2 layers then 2 layers will be transmitted.

Number of symbols across layers must be equal, e.g., if 2 transport blocks are mapped to 3 layers, then length (transport block 2)=2×length (transport block 1). This may be guaranteed by the selection of appropriate transport-block sizes, in addition to rate matching.

The modulated symbols corresponding to the transport block are mapped to the layers in an alternating fashion, i.e., if transport-block 1 symbols are: $T_1^{(1)}$, $T_2^{(1)}$, $T_3^{(1)}$, $T_4^{(1)}$, .... Then, Layer 1 symbols are: $T_1^{(1)}, T_3^{(1)}, \ldots$ and Layer 2 symbols are: $T_2^{(1)}, T_4^{(1)}$, Current mapping does not guarantee that the decoded function is an integer combination of the messages.

Figure 19:
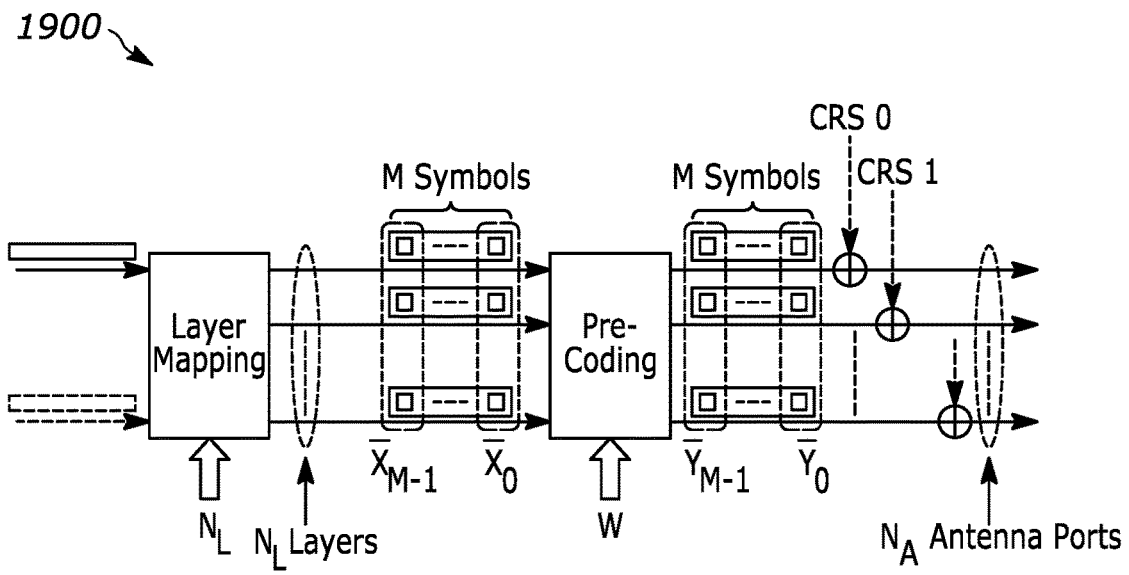
FIG. 19 is a block diagram illustrating codeword to layer mapping in LTE.
Figure 20:
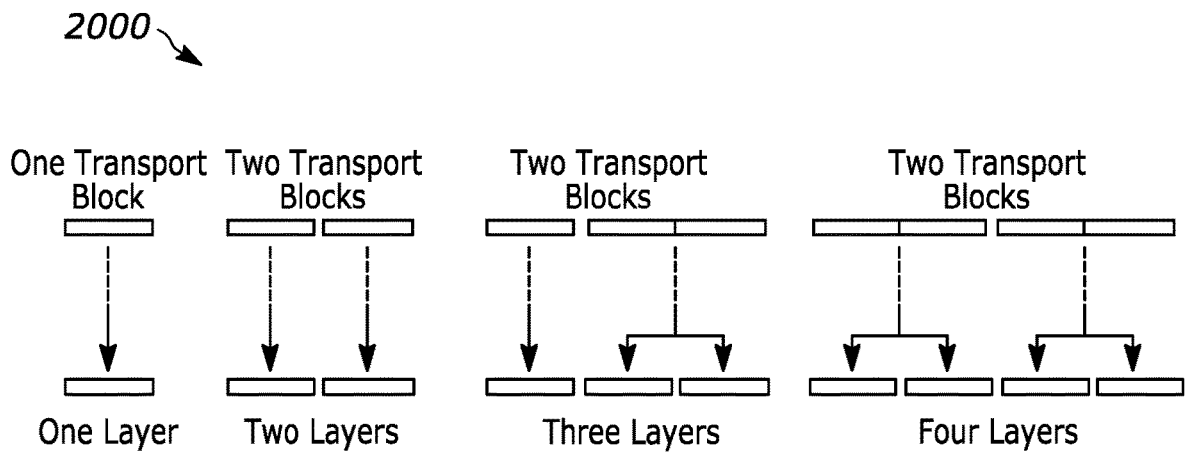
FIG. 20 is an exemplary mapping diagram illustrating a transport block to layer mapping for codebook based antenna precoding (initial transmission)

FIG. 19 illustrates a block diagram 1900 illustrating codeword to layer mapping in LTE. FIG. 20 illustrates an exemplary mapping diagram 2000 illustrating a transport block to layer mapping for codebook based antenna precoding (initial transmission).

Design of IF for Fast Fading MIMO Channels

It was discussed earlier in this disclosure that IF architecture may be useful for slow or semi-static fading scenarios. For the fast-fading channels, one embodiment may comprise to do some sort of averaging of the matrix A over multiple coherence intervals, another embodiment may comprise to use IF on a symbol level, similar to lattice-reduction-aided (LRA) receivers, with or without an outer FEC code.

However, the performance of the former approach is expected to deteriorate if the channel fading is changing in time faster than a certain threshold.

Extension to Multi-User Scenarios

Form the previous description of IF framework, it can be shown that this approach can be extended to Multi-User (MU) systems in the uplink, where each transmit antenna(s), or sub-group thereof, corresponds to a single user equipment (UE). This is possible since the encoding process is independent across antennas, with the restriction that the same code and modulation-and-coding scheme (MC S) are utilized across all UEs. The serving cell BS would then find the close-to or optimal integer-linear combinations required for the IF equalization/reception process, and hence decode the messages sent from these UEs, in a manner similar to the point-to-point case.

Usage of Different Rates for Different Layers/Users Via Subsets of the Same Lattice/Modulation The IF framework in some instances can propose using the same code with the same rate for all layers in the point-to-point transmission (and multi-user uplink) for the IF architecture. In one embodiment, it is proposed to use subsets of the same lattice/modulation for different layers/users to facilitate different-rate transmissions if their channels are different.

Framework for Downlink and Uplink Communication

In one embodiment, a receiving node with a set of receiving antenna ports may receive reference signals from a set of transmit antenna ports of at least one transmitting node. The receiving node may estimate channel characteristics such as a set of channel signatures between the set of transmit antenna ports and the set of receiving antenna ports. The receiving node may determine at least one channel quality metric, such as modified condition number and/or modified orthogonality defect, based on the estimated channel characteristics.

In one example, the receiving node may select a receiver type from a first receiver type and a second receiver type based on the determined at least one channel quality metric and a selection criterion, wherein the second receiver type is an integer forcing receiver type based on a set of integer linear combinations, the set of integer linear combinations based on the estimated channel characteristics. In one example, each integer linear combination of the set of integer linear combinations is based on a pair of channel signatures from the set of channel signatures. The first receiving type may be a conventional receiver such as MMSE-IRC, or ML-SIC.

In another example, the receiving node may select an encoding/mapping type from a first encoding/mapping type and a second encoding/mapping type based on determined at least one channel quality metric and a selection criterion for encoding a data stream. The second encoding/mapping type may support only resource allocation below a first number of RBs (e.g., RBG, PRG, subband) and at least a second number of OFDM symbols (e.g., slot), same channel coding scheme, codeword length and modulation-and-coding scheme (MCS) across all the transmission layers (at least for each modulation level) from the set of transmit antenna ports. For the first encoding/mapping type, there is no such constraints on the number of RBs, number of OFDM symbols, channel coding scheme, codeword length and modulation-and-coding scheme (MCS). The second encoding/ mapping type may be associated with a second receiver type such as integer forcing receiver type based on a set of integer linear combinations, the set of integer linear combinations based on the estimated channel characteristics. The first encoding/mapping type may be associated with a first receiving type. The first receiving type may be a conventional receiver such as MMSE-IRC, or ML-SIC.

In another example, the receiving node may select an encoding/mapping type from a first encoding/mapping type and a second encoding/mapping type further based on the traffic characteristic. For instance, the first encoding/mapping type may support low-latency traffic irrespective of whether the determined at least one channel quality metric satisfies the selection criterion. For normal traffic, the receiving node may select the encoding/mapping type based on the determined at least one channel quality metric for encoding a data stream and the selection criterion.

In one example for downlink communication, the transmit node may be a network entity, base station, gNB, eNB, relay node, TRP (Transmission/Reception Point) etc. The receive node may be a UE, remote unit, etc. The reference signals may correspond to CSI-RS and CSI-IM reference signals. The receive node may indicate the selected or recommended receiver type or encoding/mapping type to the transmit node. The receiver node may also indicate the determined channel quality metric or a function thereof (degree of channel ill-condition, degree of orthogonality defect), possibly quantized to a few bits, to the transmit node. This indication may only be signaled when the second receiver type or encoding/mapping type is selected. The transmit node may indicate in a DCI (Downlink Control Information) on a PDCCH (Physical Downlink Control Channel) scheduling the data transmission, the receiver type or encoding/mapping type used for the data transmission. In one example, the receive node may be configured to whether to determine and report receiver type/encoding/mapping type by the transmit node. In one example, the receive node may indicate a capability of supporting second receiver type/second encoding/mapping type to the transmit node.

In another example for uplink communication, the transmit node may be a UE, remote unit, etc. The receive node may be a network entity, base station, gNB, eNB, relay node, TRP (Transmission/Reception Point) etc. A first transmit node (first UE) of the at least one transmit node may comprise a first subset of antenna ports from the set of transmit antenna ports; and a second transmit node of the at least one transmit node may comprise a second subset of antenna ports from the set of transmit antenna ports. The reference signals may correspond to a first set of SRS (Sounding Reference Signals) from the first transmit node and a second set of SRS from the second transmit node. For encoding/mapping of the second encoding/mapping type, the receive node may indicate to each of the at least one transmit node the same resource allocation (e.g., RBs and OFDM symbols), same channel coding scheme, codeword length and modulation-and-coding scheme (MCS) to use for encoding each transmit node's data stream across the transmission layers, at least for each modulation level, from the corresponding subset of antenna ports. The receiving node may use an integer forcing receiver type based on a set of integer linear combinations and the received signal from the first transmit node and second transmit node, and decode, jointly for each modulation level, the data from each of first transmit node and second transmit node.

This disclosure proposes a new algorithm with a reasonable computational complexity that finds the optimal or close-to-optimal integer-linear combinations required for the IF equalizer/receiver design.

A highlighted element in our proposed method is combining the strongest channel direction with the other channel directions, one by one, using appropriate weights. The selection of weights lets us adjust the contribution of all eigenvectors to the solution. In particular, we can appropriately align the selected integer vectors for the A matrix based on the strengths of the channel directions. This is both insightful for design and also provides a close-to-optimal solution. The computational complexity is rather low.

In summary, the elements of the proposed method in accordance with at least some embodiments can include:
 A method of candidate vector generation via weighted combinations of eigenvector pairs;
 An analytically proven, tighter search radius;
 A modified greedy method for the linear independence (LI) test; and
 A direct extension of the proposed algorithm for complex MIMO channels (without transforming the complex channel to a real channel via in-phase and quadrature (IQ) decomposition).

This disclosure discusses at least three aspects:
 First, the disclosure identifies two conditions for linear receiver selection based on the MIMO channel characteristics, the signal-to-interference-plus-noise ratio (SINR) that determine if the common MMSE receiver is optimal or almost optimal, or whether the IF receiver should be used. These conditions can be conveniently checked to recommend the appropriate linear receiver to be selected, and can considerably save the UE computational (and power, etc.) resources.
 Second, the disclosure proposes an algorithm with a reasonable computational complexity that finds the optimal or close-to-optimal integer-linear combinations required for the IF receiver design. In particular, detailed description of an eigen-vector-based design for IF equalizer, where certain pairs of eigen-vectors of wireless MIMO channel are used to define the integer-linear combinations required for the IF receiver design.
 Third, implementation aspects for the integer-forcing receiver for both real and complex channel models, including how to incorporate coded modulation techniques.

Figure 21:
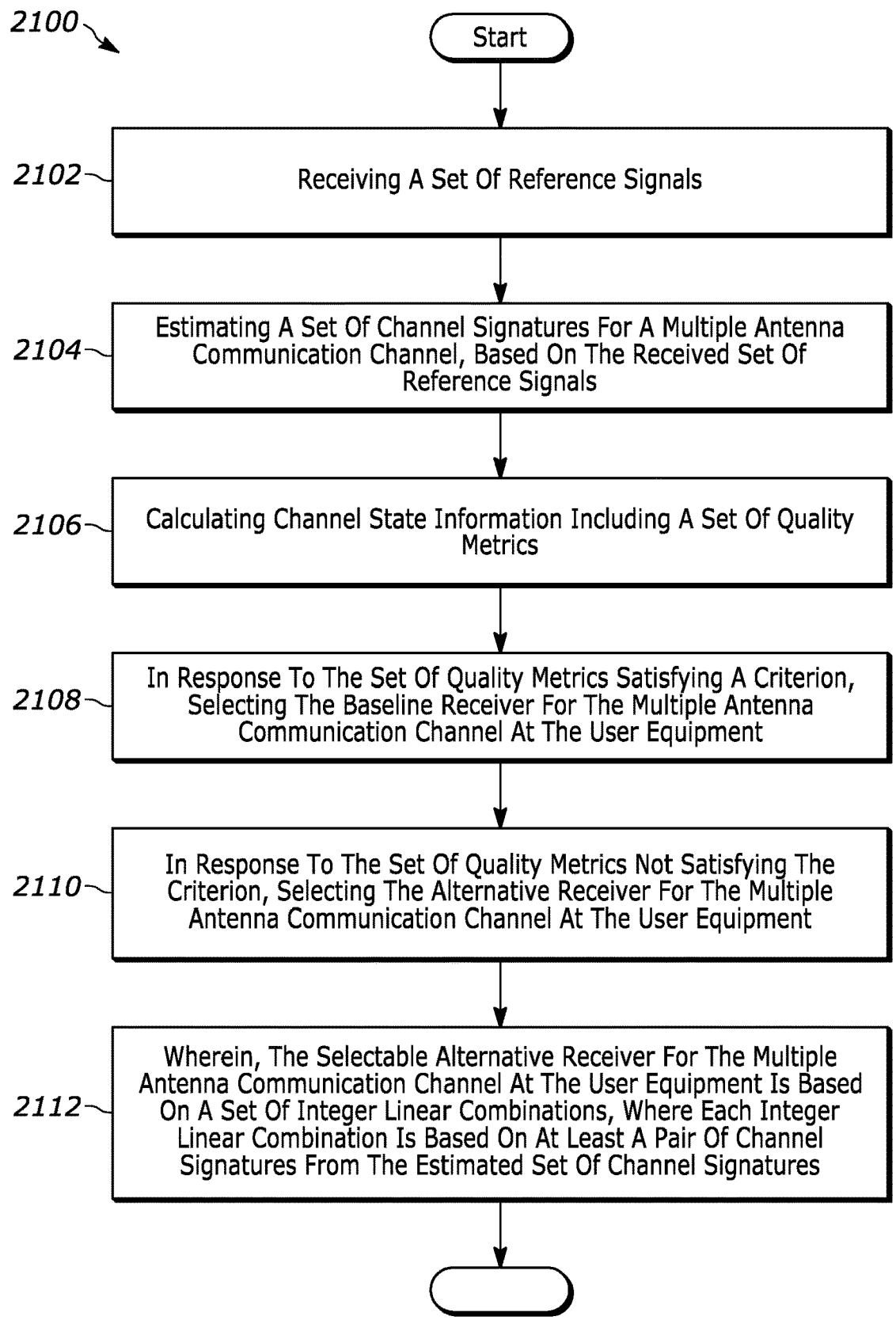
FIG. 21 is a flow diagram in a user equipment for receiver selection between a baseline receiver and an alternative receiver.

FIG. 21 illustrates a flow diagram 2100 in a user equipment for receiver selection between a baseline receiver and an alternative receiver. In accordance with at least one embodiment, the method can include receiving 2102 a set of reference signals, and estimating 2104 a set of channel signatures for a multiple antenna communication channel, based on the received set of reference signals. Channel state information including a set of quality metrics can then be calculated 2106. In response to the set of quality metrics satisfying a criterion, the baseline receiver for the multiple antenna communication channel can be selected 2108 at the user equipment. In response to the set of quality metrics not satisfying the criterion, the alternative receiver for the multiple antenna communication channel can be selected 2110 at the user equipment. The selectable alternative receiver for the multiple antenna communication channel at the user equipment can be based on a set of integer linear combinations, where each integer linear combination can be based on at least a pair of channel signatures from the estimated set of channel signatures 2112.

In some instances, the set of quality metrics can be based on the estimated set of channel signatures, and can include one or more of at least one modified condition number and a modified orthogonality defect. In some of these instances, each of the at least one modified condition number comprises a ratio based on one or more of (i) a strongest channel signature and a weakest channel signature from the set of channel signatures, and (ii) the SINR. In some of these and other instances, the modified orthogonality defect can be based on the SINR. In some instances, the set of quality metrics not satisfying a criterion can comprise one or more of (i) the modified condition number for the weakest channel signature being larger than a threshold, and (ii) the modified orthogonality defect being far from its boundary values. In some instances, the set of quality metrics not satisfying a criterion can comprise one or more of (i) the modified condition number for the weakest channel signature being larger than a threshold and (ii) a function of the modified orthogonality defect being smaller than a threshold.

In some instances, the set of quality metrics can be independent of the estimated set of channel signatures.

In some instances, the method can further includes indicating by the UE whether it is capable of supporting the receiver selection.

In some instances, the channel signatures can be based on one of an eigenvector decomposition and a singular value decomposition of the multiple antenna communication channel.

In some instances, the baseline receiver can be based on an MMSE receiver

In some instances, the baseline receiver can be equivalent to the alternative receiver having integer combinations that are proximate or equal to a unit vector with one non-zero entry.

In some instances, the alternative receiver can be an integer-forcing linear receiver.

In some instances, the alternative receiver can have integer combinations, which can include combinations that substantially deviate from a unit vector with one non-zero entry.

In some instances, the pair of channel signatures can comprises the strongest channel signature and a second channel signature from the set of channel signatures. In some of these instances, the second channel signature can have a modified condition number no less than a threshold.

In some instances, the integer linear combinations can be within a search radius, wherein the search radius is dependent upon one of more of the channel spatial correlation, the SINR, and the antenna array size at one or both of the transmitter and the receiver.

In some instances, the integer linear combinations can be linearly independent.

In some instances, the user equipment can communicates with a base station, where the channel state information is not available at the base station.

Figure 22:
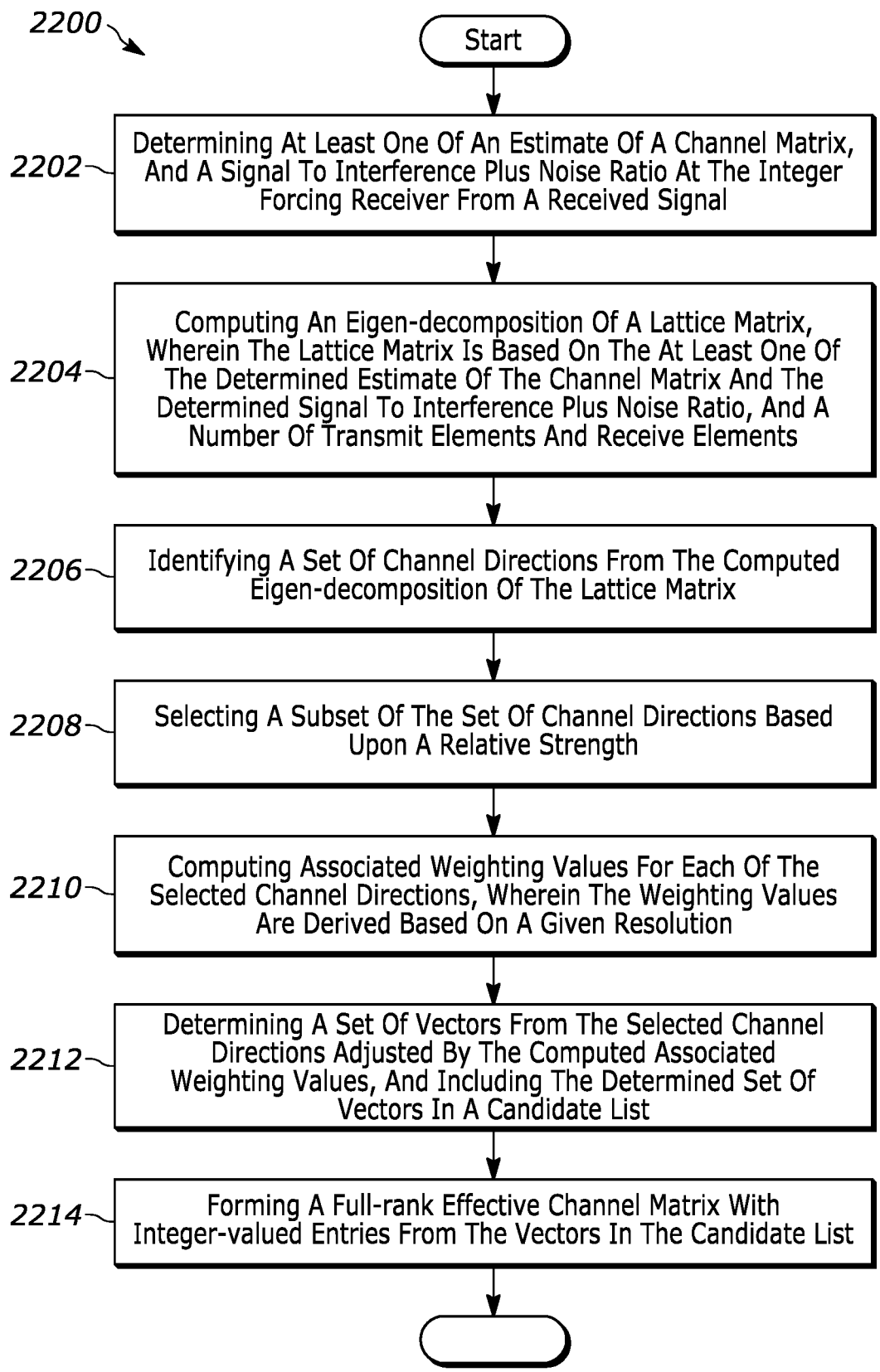
FIG. 22 is a flow diagram in a user equipment for determining preferred sets of integer linear combinations for use in an integer forcing receiver.

FIG. 22 illustrates a flow diagram 2200 in a user equipment for determining preferred sets of integer linear combinations for use in an integer forcing receiver. In accordance with at least one embodiment, the method can include determining 2202 at least one of an estimate of a channel matrix, and a signal to interference plus noise ratio at the integer forcing receiver from a received signal. An eigendecomposition of a lattice matrix can be computed 2204, wherein the lattice matrix is based on the at least one of the determined estimate of the channel matrix and the determined signal to interference plus noise ratio, and a number of transmit elements and receive elements. A set of channel directions can be identified 2206 from the computed eigendecomposition of the lattice matrix. A subset of the set of channel directions can be selected based upon a relative strength 2208. Associated weighting values can be computed 2210 for each of the selected channel directions, wherein the weighting values are derived based on a given resolution. A set of vectors can be determined 2212 from the selected channel directions adjusted by the computed associated weighting values, and the determined set of vectors are included in a candidate list. A full-rank effective channel matrix with integer-valued entries can be formed 2214 from the vectors in the candidate list.

In some instances, the channel matrix can be a multiple input multiple output (MIMO) channel matrix. In some of these instances the multiple input multiple output (MIMO) channel matrix can include a complex channel from which the effective channel matrix with integer valued entries is formed without transforming the complex channel to a real channel via an in-phase and quadrature decomposition.

In some instances, determining a set of vectors can include identifying a search radius, and removing any vectors that fall outside of the search radius from the vectors in the candidate list. In some of these instances, the identified search radius can be based upon numerical simulations of uncorrelated and correlated real channels, where the search radius is based on a predetermined percentile, which is less than 100 percent, of a norm of an actual selected integer vector by an optimal exhaustive selection method. In some of these and other instances, the identified search radius can be based on one or more of channel correlation level, determined signal to interference plus noise ratio, the number of transmit elements and receive elements.

In some instances, the candidate list can further includes the column vectors of an appropriately sized identity matrix.

In some instances, the candidate list can include vectors having non-zero associated $\alpha^T G \alpha$ values that are unique, where a refers to the candidate integer vector and G corresponds to the computed lattice matrix.

In some instances, the determined number of selected channel directions can be equal to 2, when the modified condition number corresponding to the second strongest singular vector of the channel matrix is greater than a predetermined threshold condition number.

In some instances, the determined number of selected channel directions can be based on the eigen-values of the lattice matrix.

In some instances, real and imaginary entries of the vectors in the candidate list can be rounded in an element-by-element fashion.

In some instances, the associated weighting value corresponding to the strongest channel direction can be drawn from a predetermined set of values including zero. In some of these instances, the associated weighting value corresponding to a channel direction other than the strongest channel direction can be based on the eigenvectors of the lattice matrix, the associated weighting value corresponding to the strongest channel direction and a set of half integers.

In some instances, the effective integer channel matrix can be constructed starting with the qualifying vectors associated with the strongest channel direction and sequentially adding qualifying vectors associated with the next strongest channel directions based on a linear dependence test. In some of these instances, a linear independence test can comprise selecting qualifying vectors from the candidate list that are linearly independent and provide the highest rate.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 23:
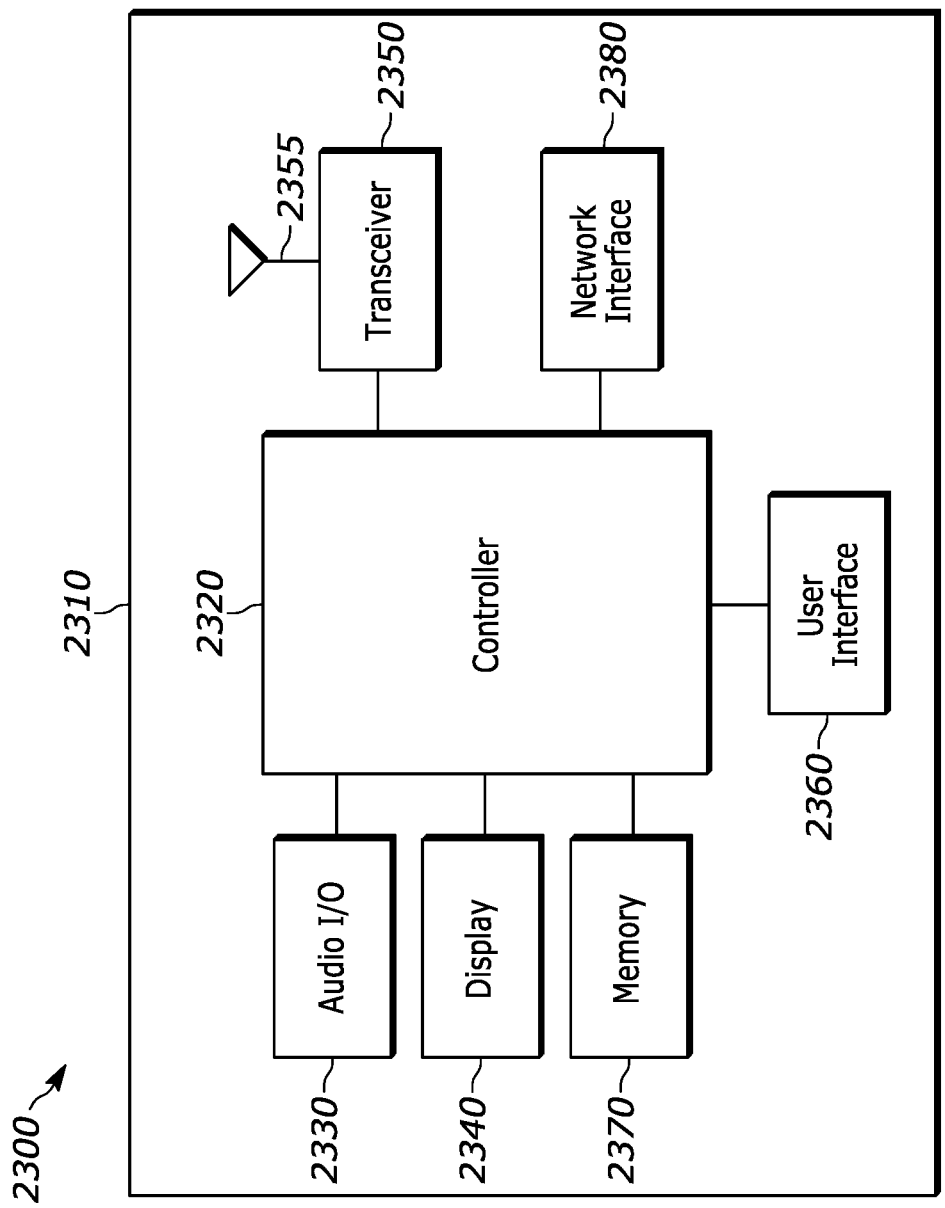
FIG. 23 is an exemplary block diagram of an apparatus according to a possible embodiment.

FIG. 23 is an example block diagram of an apparatus 2300, such as the wireless communication device 110, according to a possible embodiment. The apparatus 2300 can include a housing 2310, a controller 2320 within the housing 2310, audio input and output circuitry 2330 coupled to the controller 2320, a display 2340 coupled to the controller 2320, a transceiver 2350 coupled to the controller 2320, an antenna 2355 coupled to the transceiver 2350, a user interface 2360 coupled to the controller 2320, a memory 2370 coupled to the controller 2320, and a network interface 2380 coupled to the controller 2320. The apparatus 2300 can perform the methods described in all the embodiments The display 2340 can be a viewfinder, a liquid crystal display (LCD), a light emitting diode (LED) display, a plasma display, a projection display, a touch screen, or any other device that displays information. The transceiver 2350 can include a transmitter and/or a receiver. The audio input and output circuitry 2330 can include a microphone, a speaker, a transducer, or any other audio input and output circuitry. The user interface 2360 can include a keypad, a keyboard, buttons, a touch pad, a joystick, a touch screen display, another additional display, or any other device useful for providing an interface between a user and an electronic device. The network interface 2380 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 2370 can include a random access memory, a read only memory, an optical memory, a solid state memory, a flash memory, a removable memory, a hard drive, a cache, or any other memory that can be coupled to an apparatus.

The apparatus 2300 or the controller 2320 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 2370 or elsewhere on the apparatus 2300. The apparatus 2300 or the controller 2320 may also use hardware to implement disclosed operations. For example, the controller 2320 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 2320 may be any controller or processor device or devices capable of operating an apparatus and implementing the disclosed embodiments. Some or all of the additional elements of the apparatus 2300 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method in a user equipment for receiver selection between a baseline receiver and an alternative receiver, the method comprising:

receiving a set of reference signals;

estimating a set of channel signatures for a multiple antenna communication channel, based on the received set of reference signals;

calculating channel state information including a set of quality metrics;

in response to the set of quality metrics satisfying a criterion, selecting the baseline receiver for the multiple antenna communication channel at the user equipment;

in response to the set of quality metrics not satisfying the criterion, selecting the alternative receiver for the multiple antenna communication channel at the user equipment;

wherein, the alternative receiver for the multiple antenna communication channel at the user equipment is based on a set of integer linear combinations, where each integer linear combination is based on at least a pair of channel signatures from the estimated set of channel signatures.

2. The method of claim 1, wherein the set of quality metrics is based on the estimated set of channel signatures, and includes one or more of at least one modified condition number and a modified orthogonality defect.

3. The method of claim 2, wherein each of the at least one modified condition number comprises a ratio based on one or more of (i) a strongest channel signature and a weakest channel signature from the set of channel signatures, and (ii) a signal-to-interference-plus-noise ratio (SINR).

4. The method of claim 2, wherein the modified orthogonality defect is based on a signal-to-interference-plus-noise ratio (SINR).

5. The method of claim 2, wherein the set of quality metrics not satisfying a criterion comprises one or more of (i) the modified condition number for the weakest channel signature being larger than a threshold, and (ii) the modified orthogonality defect being far from its boundary values.

6. The method of claim 2, wherein the set of quality metrics not satisfying a criterion comprises one or more of (i) the modified condition number for the weakest channel signature being larger than a threshold and (ii) a function of the modified orthogonality defect being smaller than a threshold.

7. The method of claim 1, wherein the set of quality metrics is independent of the estimated set of channel signatures.

8. The method of claim 1, further comprising indicating by the UE whether it is capable of supporting the receiver selection.

9. The method of claim 1, wherein the channel signatures of the set of channel signatures are based on one of an eigenvector decomposition and a singular value decomposition of the multiple antenna communication channel.

10. The method of claim 1, wherein the baseline receiver is based on a minimum mean square error (MMSE) receiver.

11. The method of claim 1, wherein the baseline receiver is equivalent to the alternative receiver having integer linear combinations of the set of integer linear combinations that are proximate or equal to a unit vector with one non-zero entry.

12. The method of claim 1, wherein the alternative receiver is an integer-forcing linear receiver.

13. The method of claim 1, wherein the set of integer linear combinations of the alternative receiver has integer linear combinations, which include combinations that substantially deviate from a unit vector with one non-zero entry.

14. The method of claim 1, wherein the pair of channel signatures comprises a strongest channel signature and a second channel signature from the set of channel signatures.

15. The method of claim 14, wherein the second channel signature has a modified condition number no less than a threshold.

16. The method of claim 1, wherein the integer linear combinations of the set of integer linear combinations are within a search radius, wherein the search radius is dependent upon one of more of a channel spatial correlation, a signal-to-interference-plus-noise ratio (SINR), and an antenna array size at one or both of a transmitter and a receiver.

17. The method of claim 1, wherein the integer linear combinations of the set of integer linear combinations are linearly independent.

18. The method of claim 1, wherein the user equipment communicates with a base station, where the channel state information is not available at the base station.

19. A user equipment in a communication network, the user equipment comprising:
a transceiver including a selectable baseline receiver, and a selectable alternative receiver, that receives a set of reference signals; and
a controller that estimates a set of channel signatures for a multiple antenna communication channel, based on the received set of reference signals, and calculates channel state information including a set of quality metrics;
wherein the controller selects the selectable baseline receiver for the multiple antenna communication channel at the user equipment, in response to the set of quality metrics satisfying a criterion, and the controller selects the selectable alternative receiver for the multiple antenna communication channel at the user equipment, in response to the set of quality metrics not satisfying a criterion; and
wherein the selectable alternative receiver for the multiple antenna communication channel at the user equipment is based on a set of integer linear combinations, where each integer linear combination is based on at least a pair of channel signatures from the estimated set of channel signatures.

20. The user equipment in a communication network of claim 19, where the selectable baseline receiver and the selectable alternative receiver are part of separate signal paths within the transceiver.

21. The user equipment in a communication network of claim 19, where the selectable baseline receiver and the selectable alternative receiver are separately formed as part of a digital signal processor.

22. The user equipment in a communication network of claim 21, where the digital signal processor as part of separately forming the selectable baseline receiver and the selectable alternative receiver includes respective sets of prestored instructions.

* * * * *